(12) United States Patent
Shimao et al.

(10) Patent No.: US 8,387,526 B2
(45) Date of Patent: Mar. 5, 2013

(54) PRECISION PRESS DEVICE AND PRESS LOAD CONTROL METHOD THEREOF

(75) Inventors: Daisuke Shimao, Tainai (JP); Katsuaki Inoue, Shibata (JP); Takashi Kurata, Sekikawa (JP)

(73) Assignee: Hitachi Industrial Equipment Systems Co., Ltd., Kanda Neribei-cho, Chiyoda-ku Tokyo (JP)

( * ) Notice: Subject to any disclaimer, the term of this patent is extended or adjusted under 35 U.S.C. 154(b) by 356 days.

(21) Appl. No.: 12/546,110

(22) Filed: Aug. 24, 2009

(65) Prior Publication Data
US 2010/0089255 A1  Apr. 15, 2010

(30) Foreign Application Priority Data

Oct. 9, 2008 (JP) ................................. 2008-262699
Oct. 9, 2008 (JP) ................................. 2008-263224

(51) Int. Cl.
*B30B 15/16* (2006.01)
*B30B 1/32* (2006.01)
(52) U.S. Cl. ................ 100/269.06; 100/269.01; 100/90; 100/315; 425/405.1; 425/407
(58) Field of Classification Search .............. 100/90, 100/269.01, 315, 326, 269.06; 425/388, 425/405.1, 407, 408; 264/553
See application file for complete search history.

(56) References Cited

U.S. PATENT DOCUMENTS

| 5,182,121 A | * | 1/1993 | Miyashita et al. ............ 425/338 |
| 5,993,189 A | * | 11/1999 | Mueller et al. ............. 425/405.1 |
| 7,195,476 B2 | * | 3/2007 | Ito ................................. 425/388 |
| 2001/0039701 A1 | | 11/2001 | Lines et al. |

FOREIGN PATENT DOCUMENTS

| EP | 0 338 562 A2 | 10/1989 |
| GB | 1 413 320 A | 11/1975 |
| JP | 10-085998 A | 4/1998 |
| JP | 10-156943 | 6/1998 |
| JP | 2002-096199 A | 4/2002 |
| JP | 2002-100079 | 4/2002 |
| JP | 2003-054963 | 2/2003 |
| JP | 2003-181697 | 7/2003 |
| JP | 2004-136334 A | 5/2004 |
| JP | 2004-330291 A | 11/2004 |
| JP | 2005-052841 | 3/2005 |
| JP | 2008-012918 A | 1/2008 |

OTHER PUBLICATIONS

Partial European Search Report issued in European Patent Application No. EP 09252038.6 dated Nov. 30, 2012.

* cited by examiner

*Primary Examiner* — Jimmy T Nguyen
(74) *Attorney, Agent, or Firm* — McDermott Will & Emery LLP

(57) ABSTRACT

The present invention provides a precision press device and a press load control method thereof for downsizing a vacuum chamber in press work in the vacuum chamber, shortening a time required to reach a vacuum and further performing high accuracy pressure control. To downsize a chamber 16, a pressure sensor is set up outside the chamber 16 and a cylinder chamber 17 is formed to allow a tubular plunger 7 to slide up and down using the tubular shape of the chamber 16. A negative pressure 22 in the chamber 16 attracts the pressurized section 2 and the pressurizing section 1 to each other, but by injecting an equivalent pressure 19 of a fluid into the cylinder chamber 17, pushing out the tubular plunger 7, the attractive forces are canceled out. It is possible to control the load on the substrate or the like transferred by the press stage with high accuracy.

9 Claims, 16 Drawing Sheets

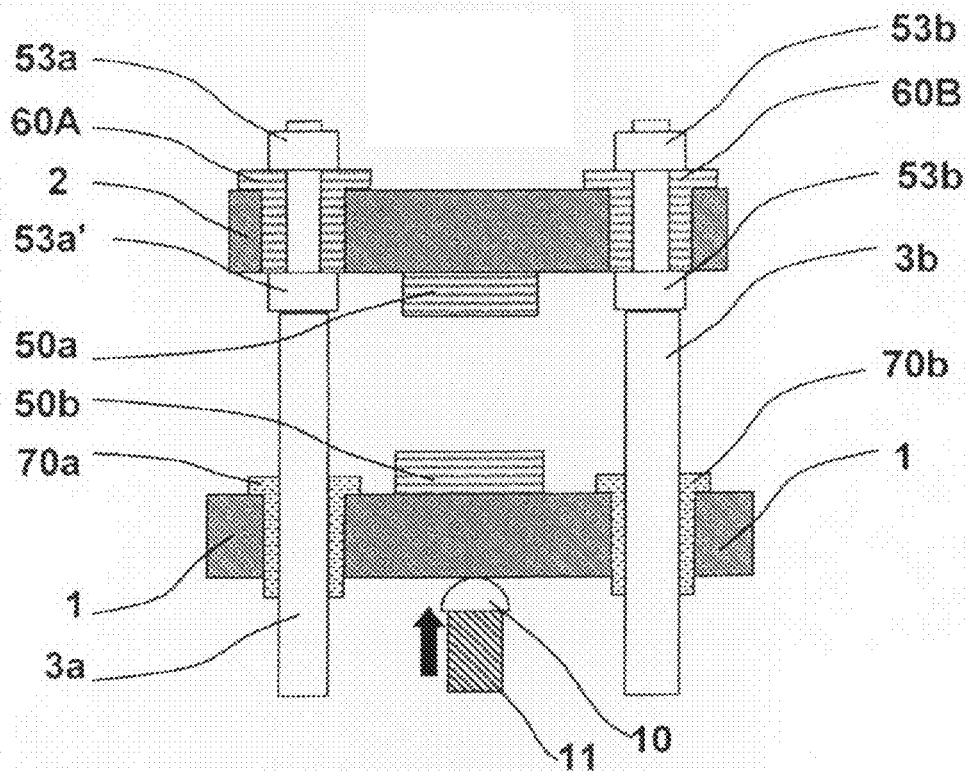
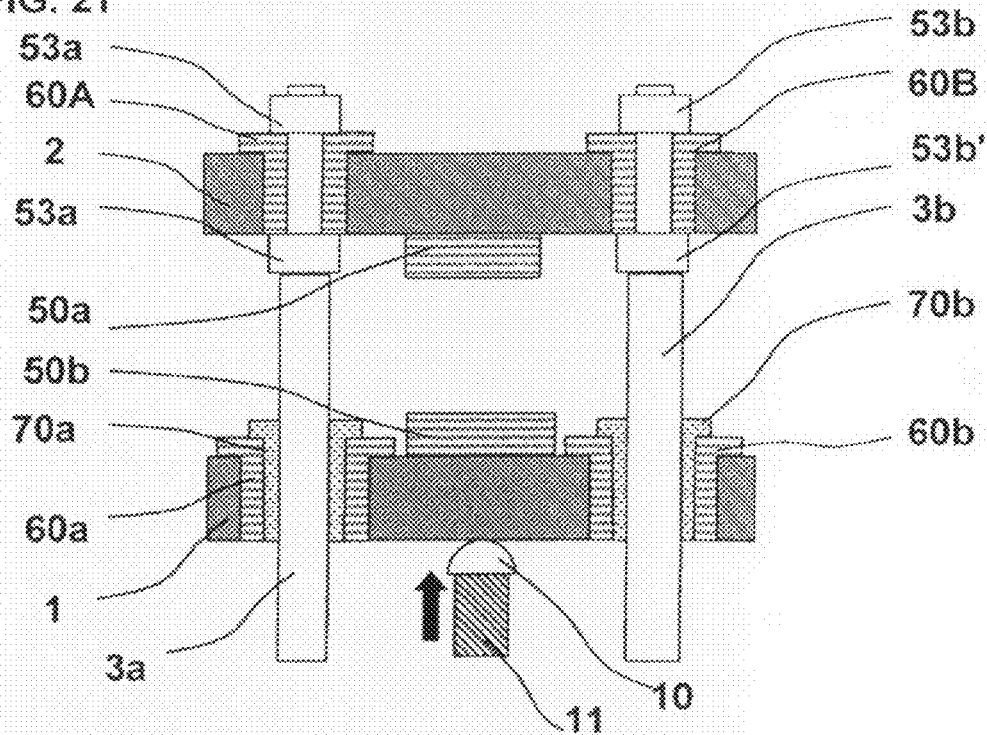

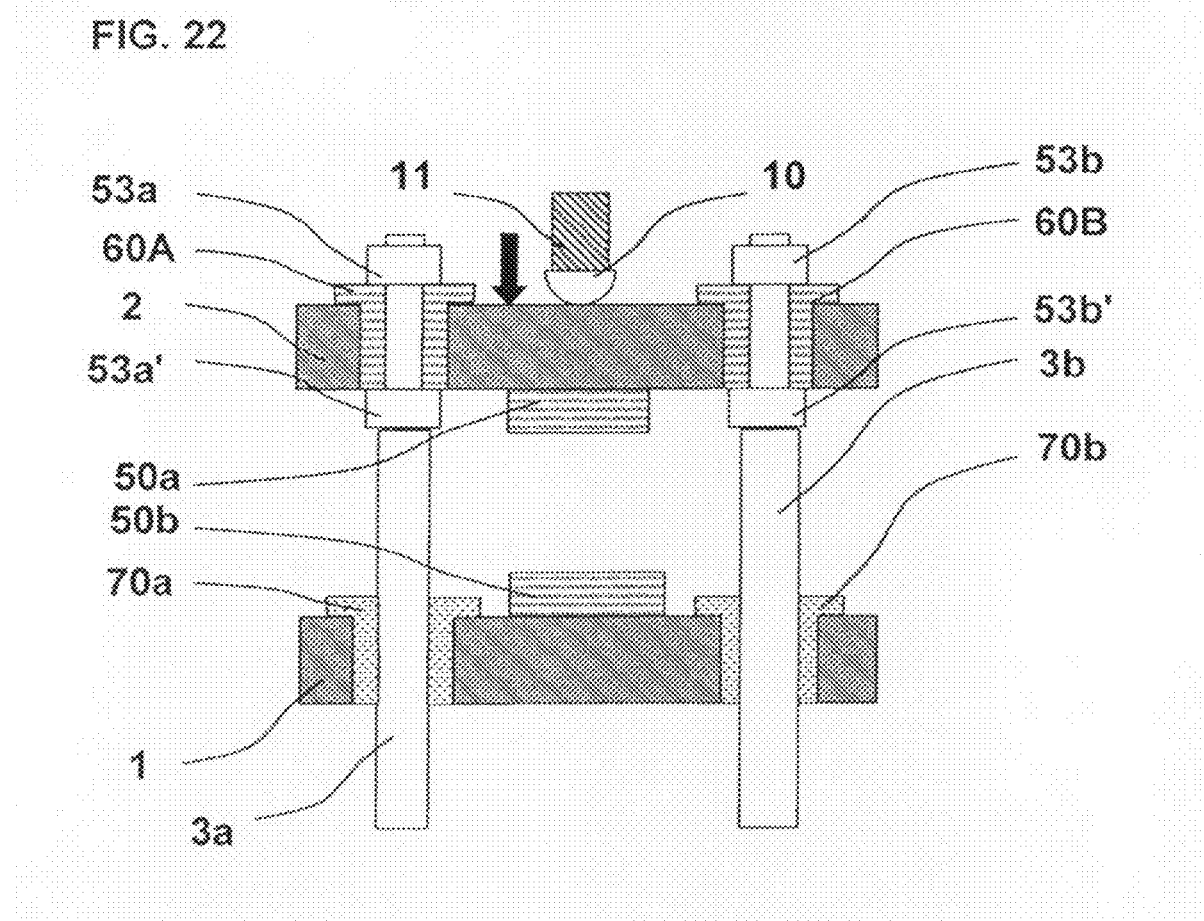

PRECISION PRESS DEVICE AND PRESS LOAD CONTROL METHOD THEREOF

The present application is based on and claims priorities of Japanese patent applications No. 2008-263224 filed on Oct. 9, 2008 and No. 2008-262699 filed on Oct. 9, 2008, the entire contents of which are hereby incorporated by reference.

BACKGROUND OF THE INVENTION

1. Field of the Invention

The present invention relates to a precision press device capable of transferring a micro structure with a high degree of flatness, and more particularly, to a precision press device applied to a micro structure transfer mold and a micro structure transfer device for pressing a matrix (micro structure transfer mold) which serves as a source with a micro uneven pattern formed on the surface against a target substrate (transfer target) for transferring/forming the micro uneven pattern onto the substrate surface and a press load control method thereof.

2. Description of the Related Art

As for the above described micro structure transfer devices, relatively low-cost nano-level imprinting devices are currently sold. The micro structure transfer devices are capable of nano-level transfer and those devices are generally called "nano imprinting devices." Resin, glass or the like is mainly used as the material for the transfer targets, and devices based on the nano imprinting scheme are roughly classified into two categories depending on characteristics of those materials: optical nano imprinting devices using ultraviolet rays and thermal nano imprinting devices using heat. Furthermore, there are transfer schemes such as a parallel plate scheme using the principles of a general press device and a roller-type sheet nano device.

Here, during a transfer to a transfer target, the flatness and high accuracy of parallelism of a press stage section are particularly important for a parallel plate type nano imprinting device, and the uniformity of heat and pressure is also required. Furthermore, bubbles may be produced because press work is applied to the surface, and currently a transfer is generally performed in vacuum to avoid bubbles from mixing into the transfer target for both optical nano printing and thermal nano printing. Examples of current vacuum press devices include a scheme that performs press in a vacuum box as shown in FIG. 4, a scheme that mounts a sealing function using a spring or O-ring or the like near a press stage section and evacuates only the press stage and the pressurization section as described in Japanese Patent Laid-Open Publication No. 10-136943 or a scheme that performs press using an internal mechanism in vacuum with upper and lower housings contacting each other as described in Japanese Patent Laid-Open Publication No. 2003-181697.

In recent years, the parallel plate type devices are required to meet demands for not only downsizing, a cost reduction and task enhancement of the devices but also adaptability to transfer of materials a variety of sizes and types from small (20 mm per side) to large (φ300 mm).

As for the press scheme, there are devices using an air cylinder but servo press capable of easily realizing high-level control is becoming common. The nano imprinting devices themselves are mainly used in the semiconductor-related fields and are generally used in a clean room, and therefore not many devices adopt a hydraulic cylinder from the standpoint of dust generation and pollution.

In the case of a nano imprinting device capable of also large size (φ300) transfer, the use of a vacuum box results in a problem that the size of the device increases. Here, in view of downsizing of the device, devices with a sealing function provided in the vicinity of the press plate are considered effective. Here, a pressure fluctuation occurring in a chamber during evacuation will be considered. In a device capable of a large φ300 transfer, suppose the size of the room interior to be evacuated is φ300 and a pressure difference between the atmosphere and vacuum is approximately 0.1 MPa. A negative pressure equivalent to a load of approximately 720 kg is generated in the chamber until the press plate comes into contact.

Furthermore, in this device that allows large-size transfer, a negative pressure of only approximately 4 kg is produced when a small-size (20 mm per side) transfer is performed. No negative pressure is further produced in the area with which the transfer target is in contact, but the negative pressure is produced in the area with which the transfer target is not in contact in the vacuum chamber, and therefore there is a problem that a load of approximately 716 kg is placed on the small-size (20 mm per side). When a vacuum box is used, if the diameter of a sliding shaft is set to φ60 mm, a negative pressure of approximately 29 kg is produced. Here, even if an attempt is made to attain a balance with the negative pressure using a repulsive force of an O-ring or spring, the device becomes unusable if only the transfer target has a different size and thickness.

Here, to perform feedback control on the pressure, a pressure sensor is provided inside or outside the vacuum chamber of the nano imprinting device. However, since there is always a boundary between the chamber and movable shaft, there is a problem that an evacuation pressure in a vacuum condition to the diameter of the shaft or diameter of the chamber is produced on the pressurization axis as a negative pressure. Furthermore, the method whereby a pressure sensor is installed in the vacuum chamber also involves a problem that the chamber unit grows in size and complexity. Furthermore, there is also a problem that the negative pressure increases as the press stage and diameter of the shaft increase, and further the size of the transfer target also influences the pressure at the time of press work.

Furthermore, as for the above described micro structure transfer device, relatively low-cost nano-level imprinting devices are currently available on the market. The micro structure transfer devices can realize nano-level transfer and such devices are generally called "nano imprinting device." Resin, glass or the like is mainly used as the material of the transfer target, and the nano imprint scheme is roughly classified under two categories depending on the characteristics of those materials; optical nano imprinting devices using ultraviolet rays and thermal nano imprinting devices using heat. Furthermore, examples of the transfer scheme include a parallel plate scheme using the principles of a general press device and a roller type sheet nano device.

Here, the flatness and parallelism of the press stage section are particularly important for the parallel plate type nano imprinting device. Examples of a parallelism adjusting mechanism for devices currently in use include a scheme whereby a spherical bearing mechanism is set up right below the press stage of any one of the pressurized side and the pressurizing side of the press mechanism so as to slide on the sphere and adjust the parallelism and a scheme whereby an elastic body such as a spring is attached right below the press stage.

In recent years, there are growing demands for upsizing and task enhancement of micro structure transfer devices. However, the increase in the size of parallel plate type nano imprinting devices is accompanied by problems like deterioration of the accuracy of flatness, parallelism or the like, and increased differences in the required pressure and temperature or the like depending on the size and material of the transfer target, thus widening the scope of application and making control more complicated.

As a press scheme, there are devices using an air cylinder, but devices using servo press that can easily realize high-level control are becoming popular. The nano imprinting devices are mainly used in the semiconductor-related fields and are generally used in a clean room, and therefore not many devices adopt a hydraulic cylinder from the standpoint of dust generation and pollution.

Among press machines that pressurize a part sandwiched between two opposing surfaces, there is a proposal of a press machine that rotatably supports a mold retention plate including one surface via a spherical bearing whose center is located on the normal to the surface, provides fixing means for stopping the rotation of the mold retention plate, attaches an elastic sheet to the one surface in an easily detachable manner, and thereby provides trackability (correction performance) to nonuniformity in the thickness of a pressurization target and allows the pressurized section to be separated and extracted (see Japanese Patent Laid-Open Publication No. 2005-52841).

Furthermore, there is a proposal of a press molding device that forms a surface of a lower molding die opposite to an optical surface from which a shape is transferred to a material into a convex spherical shape, forms a matrix that holds the lower molding die into a concave spherical shape corresponding to the spherical shape of the lower molding die, assumes the curvature center of the convex spherical surface and the concave spherical surface to be a position of the pressed molded product on the central axis of the molding die or a position within a range of the thickness of the molded product on the central axis from an end face of the molded product on the central axis, causes a body die to come into contact with an upper molding die at the time of press molding, and causes the lower molding die to swing, thereby causing the axial lines of both molding dies to match and automatically adjusting inclination (see Japanese Patent Laid-Open Publication No. 2003-54963).

Furthermore, in nano imprinting, there is a proposal of a transfer device and transfer method including matrix retaining means for retaining a matrix having a pattern corresponding to information, substrate retaining means for retaining a substrate to which the matrix pattern is transferred, fixing means for fixing a distance between the matrix and substrate, pressure applying means for applying a pressure between the matrix and substrate, and fixing canceling means interposed between the matrix retaining means and substrate retaining means and having an elastic body disposed around the matrix and substrate, for canceling the fixing the distance between the matrix and substrate by the fixing means and separating the matrix from the substrate, capable of uniformly applying a pressure to the matrix and substrate and easily separating the matrix from the substrate after a transfer (see Japanese Patent Laid-Open Publication No. 2002-100079).

However, when a heavy load is required or the size of the transfer target increases, as in the case of the nano printing technique according to Japanese Patent Laid-Open Publication No. 2005-52841 and Japanese Patent Laid-Open Publication No. 2003-54963, the structure whereby the load is received by a spherical surface causes the spherical mechanism itself to grow in size, increasing the possibility of producing friction, abrasion or a biting phenomenon. Furthermore, restoring the spherical bearing after having followed the inclination to its original horizontal condition requires an elastic body such as a spring to be used, which particularly complicates the mechanism in the vicinity of the press stage and further leads to upsizing and high cost. According to Japanese Patent Laid-Open Publication No. 2002-100079, when the load is received by a spring, the size of the spring increases to an extreme especially when the required load is large. There is also a problem that it is difficult to obtain uniform temperatures and temperature rise times are extended. Especially, it is essential that the surfaces of the pressurized section and the pressurizing section come into contact with the surface of the thermal nano printing press parallel to each other. However, it is extremely difficult to work the pressurizing section or the pressurized section with high accuracy and further work/adjust the guides of the pressurizing section and the pressurized section with high accuracy. To achieve highly accurate parallelism, various measures have been taken, for example, providing a spherical bearing right below the pressurizing section or pressurized section, using air or an equivalent fluid or elastic body as a cushion, adopting a link mechanism for the pressurized section and providing right below the press stage a mechanism for receiving a pressure in parallel. However, various elements such as a heater and cooling path need to be added to the press stage and there is a problem that most of such mechanisms are likely to grow in size and complexity.

In view of the above described technical problems, it is an object of the present invention to provide a micro structure transfer device (nano imprinting device) having a simple structure and capable of high accuracy pressure control in nano printing, which is a pattern transfer technique to form a micro structure.

Noticing the difficulty in work on parts and assembly on nano-level order and difficulty in a nano-level press because it is a press between rigid bodies, there are problems to be solved in absorbing the inclination and deflection on both sides of the matrix retaining side and the substrate retaining side with respect to a guide section that retains or slidably engages both sides to thereby enable a pressure to be applied to the matrix and the substrate uniformly.

It is therefore an object of the present invention to provide a micro structure transfer device having a simple structure around a press stage and providing an excellent way of adjusting parallelism in a nano printing method which is a pattern transfer technique including steps of manufacturing a product having a micro or ultra-micro processing pattern for forming a micro structure.

SUMMARY OF THE INVENTION

The present inventor has come up with the present invention noticing a small mechanism capable of performing high accuracy pressure control. The present invention provides a device that provides, in consideration of downsizing, a sealing mechanism which becomes a vacuum chamber in the vicinity of a press plate, mounts a cylinder function in the chamber itself to cancel out a negative pressure during evacuation, controls a pressure of a fluid supplied to the cylinder to thereby achieve a balance between the negative pressure and the pressure of the cylinder during evacuation and thereby eliminates influences of vacuum. Furthermore, since it is possible to use the stroke of the cylinder, the present invention provides a precision vacuum press mechanism free of influences in the thickness direction of a transfer target.

The precision press device according to the present invention is a precision press device including a pressurized section, a pressurizing section opposed to the pressurized section and disposed in a manner movable forward or backward with respect to the pressurized section, press stages mounted on opposing surfaces of the pressurized section and the pressurizing section, a drive section that drives the pressurizing section and a chamber having a tubular wall that surrounds the press stages so that the press stages are sealed between the pressurized section and the pressurizing section when the pressurized section and the pressurizing section are located close to each other, wherein the precision press device is provided with a fluid operation section that cancels out attractive forces between the pressurized section and the pressurizing section generated based on a negative pressure in the chamber.

The press load control method for the precision press device according to the present invention is a press load control method for a precision press device including a pressurized section, a pressurizing section opposed to the pressurized section and disposed in a manner movable forward or backward with respect to the pressurized section, press stages mounted on opposing surfaces of the pressurized section and the pressurizing section, a drive section that drives the pressurizing section and a chamber having a tubular wall that surrounds the press stages so that the press stages are sealed between the pressurized section and the pressurizing section when the pressurized section and the pressurizing section are located close to each other, the method using the tubular wall as a tubular plunger provided in a manner movable forward or backward based on a fluid pressure in the cylinder formed in at least one of the pressurized section and the pressurizing section with respect to the other and balancing and canceling out attractive forces between the pressurized section and the pressurizing section generated based on a negative pressure in the chamber and the pressurizing force generated in the tubular plunger based on the fluid pressure.

According to the precision press device and the press load control method thereof according to the present invention, forces attracting the pressurized section and pressurizing section to each other are generated caused by a negative pressure in the chamber, but it is possible to generate a pressurizing force in the tubular plunger based on the fluid pressure in the cylinder and cause the attractive forces and the pressurizing force to balance and cancel out each other, and thereby control the load on the substrate or the like transferred by the press stage based on the drive force of the drive section with high accuracy.

Furthermore, in order to solve the above described problem, the precision press device according to the present invention includes a pressurizing section that is slidably guided along a guide post via a retainer, a pressurized section that is fixed to the guide post, press stages mounted on opposing surfaces of the pressurizing section and the pressurized section and a drive section that drives the pressurizing section via a bearing member, wherein an elastic body is inserted between the pressurizing section and the retainer and/or between the pressurized section and the guide post, and when the elastic body deforms, the surfaces of both press stages align with each other making uniform a load applied to both press stages.

According to this precision press device, a mechanism for adjusting parallelism is disposed not in the vicinity of the press stages but between the guide post and the pressurizing section and/or pressurized section as an elastic body, and therefore a relative inclination and deflection between the pressurizing section and pressurized section are absorbed by the elastic body.

According to the present invention, it is possible to realize a precision press device and press load control for the precision press device capable of realizing a good vacuum condition and high precision pressure control in a simple and low-cost structure. Furthermore, when the precision vacuum press device of the present invention is applied to a micro structure transfer device, it is possible to easily respond to a variation in the thickness of a transfer target material.

Furthermore, according to the precision press device of the present invention, it is possible to realize a micro structure transfer device capable of achieving parallelism with high accuracy in a simple structure and at low cost. Furthermore, not only the structure of the mechanism for adjusting parallelism itself is simple but also the structure around the press stages is simplified. It is possible to dispose a sensor for detecting a press condition or means for carrying out thermal management such as a heater or cooling path around the press stages, facilitate temperature management, prevent interference with a temperature rise or drop and realize a parallelism alignment irrespective of low pressure or high pressure or the size of the transfer target.

BRIEF DESCRIPTION OF THE DRAWINGS

FIG. 20 is a cross-sectional schematic diagram illustrating another embodiment of the precision press device according to the present invention;

FIG. 21 is a cross-sectional schematic diagram of a further embodiment of the precision press device according to the present invention; and FIG. 22 is a cross-sectional schematic diagram of a still further embodiment of the precision press device according to the present invention.

DETAILED DESCRIPTION OF THE PREFERRED EMBODIMENTS

Figure 1:
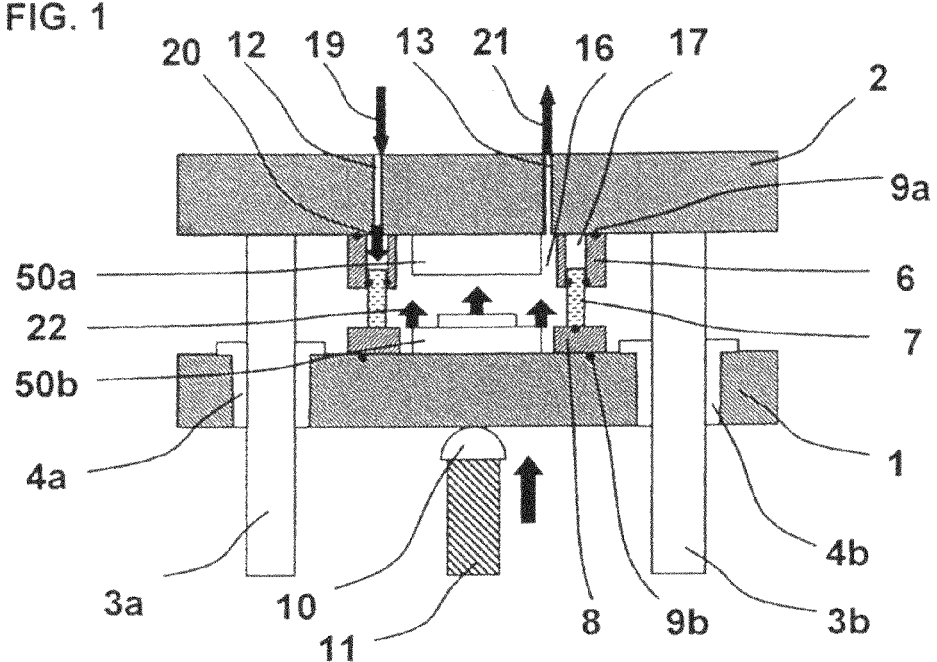
FIG. 1 is a cross-sectional schematic diagram illustrating an embodiment of a precision press device according to the present invention.

Hereinafter, an embodiment of the precision press device according to the present invention will be explained with reference to FIG. 1 and FIG. 2.

The present embodiment of the precision press device is applied as a micro structure transfer device (nano imprinting device) that performs press molding in an ultra-micro pattern. The precision press device shown in FIG. 1 is basically provided with a pressurized section 2 fixed at one end of a plurality of guide posts 3a and 3b disposed in parallel (hereinafter, reference numeral 3 will be collectively used and the same will apply to other components), a pressurizing section 1 disposed opposed to the pressurized section 2 that slides on the guide posts 3 in a manner movable forward or backward with respect to the pressurized section 2 and a drive section 11 that drives the pressurizing section 1 toward the pressurized section 2 via a free bearing 10. Here, the free bearing 10 is a flexible joint and also measures a pressure in combination with a pressure sensor. Providing three or more guide posts 3 allows the pressurizing section 1 to be guided uniformly. The number of the guide posts 3 may be 2 as long as the parallelism between the guide posts can be secured.

The pressurizing section 1 is disposed slidably on the guide posts 3 via retainers 4. Slide holes are formed in the pressurizing section 1 to allow the respective guide posts 3 to pass therethrough. As the retainers 4, for example, direct-acting guide bearings or the like can be used and can provide a high degree of alignment until a molding die comes into contact with a transfer target. The retainer 4 is formed into a tubular shape with a flange section provided at one end thereof and is positioned with the flange section contacting the pressurizing section 1. The guide post 3 is inserted into the cylindrical interior of the retainer 4, whereby the retainer 4 can slide on the guide post 3, and as a result, the pressurizing section 1 can slide on the guide post 3 via the retainer 4.

Press stages 50a and 50b are provided on the opposing surfaces of the pressurizing section 1 and pressurized section 2 respectively. A matrix with a fine pattern applied to the surface thereof is placed on one of the press stages 50a and 50b, and a substrate is placed on the other, and the substrate and the matrix are pressed against each other at the time of a press, and the fine pattern of the matrix is thereby transferred to the substrate.

The drive section 11 that drives the pressurizing section 1 presses the pressurizing section 1 via the tree bearing 10. The free bearing 10 has a spherical distal end, and even when the pressurizing section 1 and the pressurized section 2 align with each other during the press operation, that is, when the press stages 7a and 7b, which will be described later align with each other, the free bearing 10 can place a load on the pressurizing section 1 at a single point. Therefore, the alignment between the pressurizing section 1 and pressurized section 2 is maintained, a uniform load is placed on the press stage 7 and press molding can be performed with high accuracy of flatness.

The pressurizing section 1 and the drive section 11 are not fixed via a bolt but attached so as to be rockable to a certain extent by means of a stripper bolt, damper, spring or the like, and placed on the free bearing 10. The free bearing 10 is used as a medium whereby the drive section 11 and the pressurizing section 1 contact each other, but a free joint provided with a spherical bearing which combines a sphere and a spherical surface can also be used.

The precision press device can use a servo motor, air cylinder, hydraulic cylinder or the like as the drive source of the drive section 11.

In the precision press device, when the drive section 11 presses the pressurizing section 1, the contact point at which the free bearing 10 contacts the pressurizing section 1 is assumed to be a single point, but it is also possible to adopt a configuration with a plurality of points uniformly arranged. When a plurality of points are arranged, the respective points are arranged uniformly, and therefore loads are uniformly placed on the pressurizing section 1 and press stage 50b.

In the precision press device, the chamber 16 has a shape that surrounds the press stage 50a, 50b within a minimum range. The chamber 16 is provided on the respective sides of the pressurizing section 1 and the pressurized section 2 (that is, upper and lower two parts) or at least one side. In the illustrated example, the chamber 16 is a tubular cylinder type chamber provided with a tubular plunger 7 that can be made to slide up and down by a fluid on the pressurized section 2 side and the chamber 16 is made up of a ring 8 having a fixed height on the pressurizing section 1 side which is the other side. Instead of the ring 8, the chamber may also be a tubular cylinder type chamber similar to that of the chamber 16 on the pressurizing section 1 side. When the chamber 16 is evacuated, at least one ring-shaped elastic body 9 for retaining the vacuum is set on the surface of the chamber 16, that is, the end face contacting the opposing surfaces of the pressurizing section 1 and the pressurized section 2.

A pressure 19 of the fluid entering the cylinder chamber 17 is controllable. At the time of a press, the chamber 16 is evacuated to a so-called vacuum state. A negative pressure 22 produced in the chamber 16 causes forces caused by pressures of the outside air to act on the pressurizing section 1 and the pressurized section 2, which attract the two sections to each other. Injecting the fluid from a pressurization port 12 into the cylinder chamber 17 causes the plunger 7 to be pushed down, produces a pressurizing force 20 in a direction in which the pressurizing section 1 separates from the pressurized section 2 and allows the attractive forces based on the negative pressure 22 to be canceled out.

Figure 7:
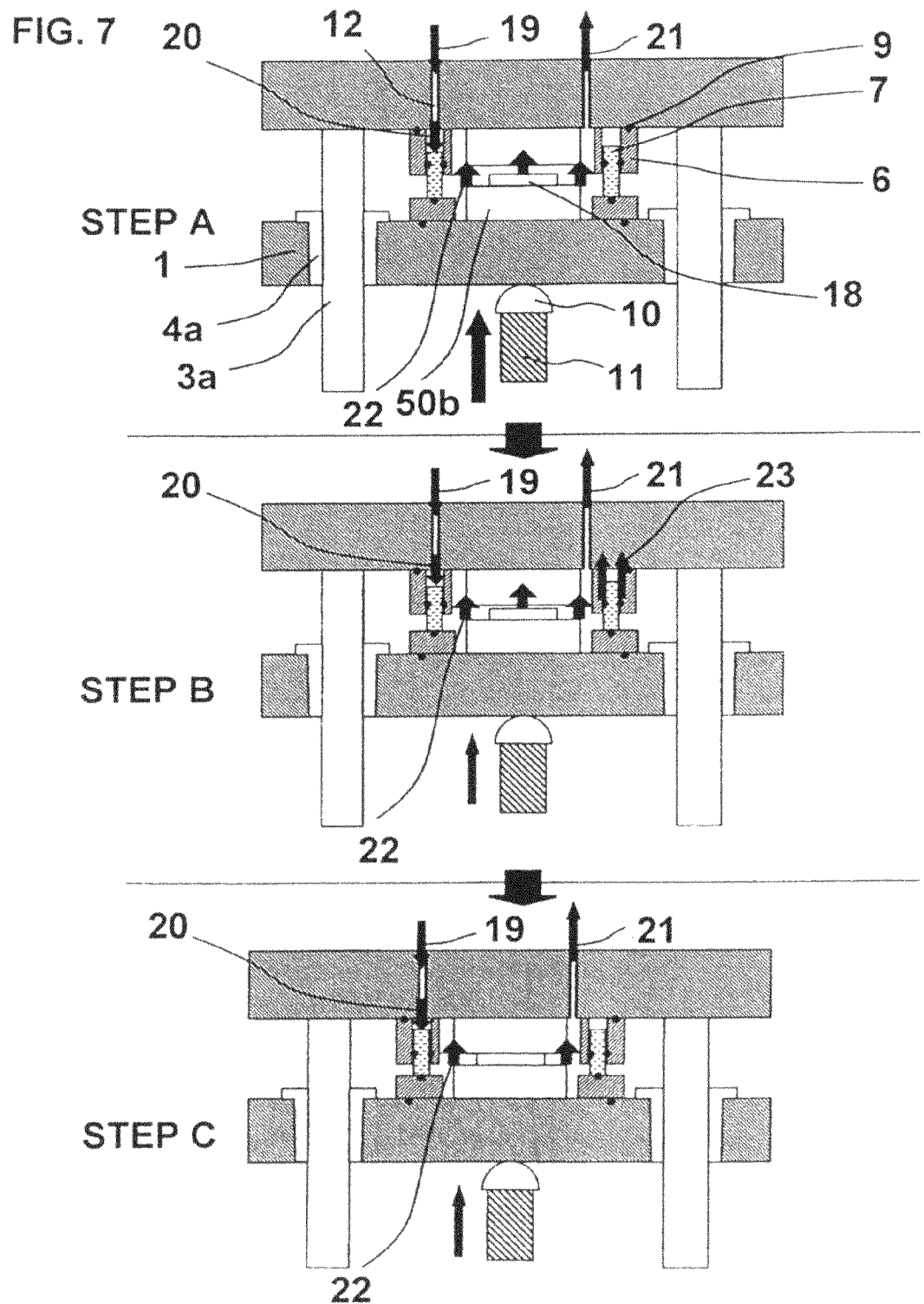
FIG. 7 is a schematic diagram of step operations at the time of a vacuum press.

There are three timings for adjusting the pressure: steps A, B and C as shown in FIG. 7 and the pressure is controllable according to their respective situations. FIG. 8 to FIG. 11 illustrate a control block diagram of such a precision press device and flowcharts of the respective steps in the pressure control.

Figure 8:
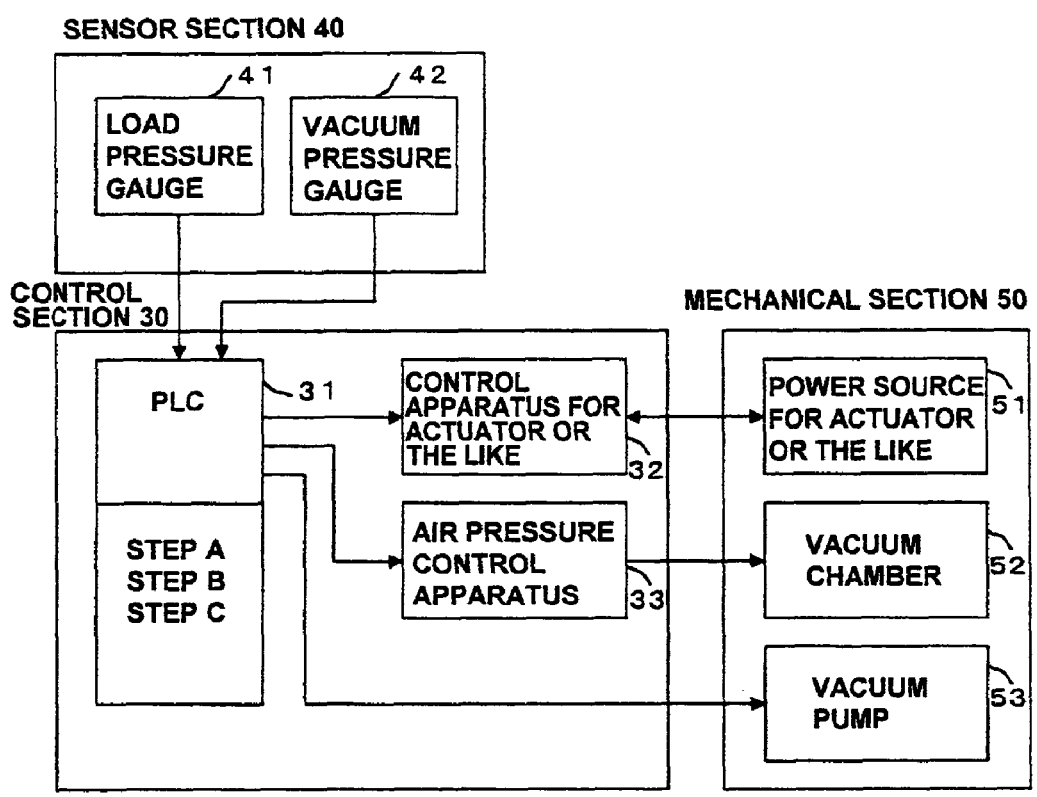
FIG. 8 is a control block diagram of a precision press device according to the present invention.

According to the control block diagram of the precision press device shown in FIG. 8, the precision press device is made up of a control section 30, a sensor section 40 and a mechanical section 50. The sensor section 40 is provided with a load pressure gauge 41 that detects a press load and a vacuum pressure gauge 42 that detects the pressure in the chamber 16. The control section 30 is provided with a PLC (programmable controller) 31 that receives the detected outputs from the respective pressure gauges of the sensor section 40, a control section 32 for a control apparatus such as actuator that receives the output of the PLC 31 and constitutes the drive section 11 and a control section 33 for an air pressure control apparatus that controls the pressure of a fluid into the cylinder chamber 17. Control contents of steps A, B and C are written in the PLC 31 as a program. Furthermore, the PLC 31 controls a vacuum pump 53 that changes/controls the pressure in the chamber 16. The mechanical section 50 is provided with a power source 51 for the drive section 11 or the like, a fluid operation section (vacuum chamber) 52 provided with the cylinder chamber 17 that causes the plunger 7 of the chamber 16 to slide up and down and the vacuum pump 53.

Figure 9:
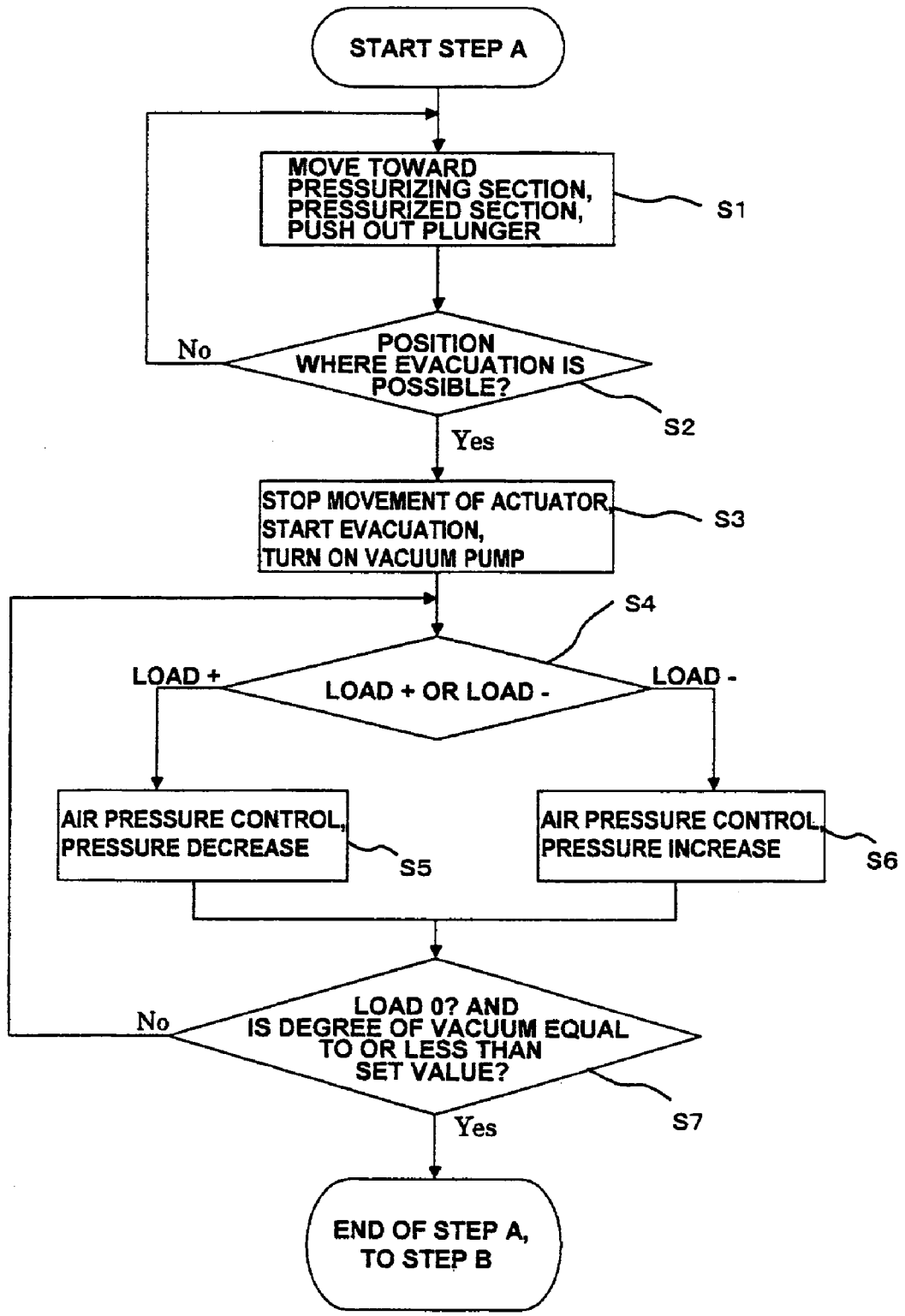
FIG. 9 is a flowchart in step A.

In step A, as shown in the top figure in FIG. 7, the pressurizing section 1 is driven by the drive section 11 and pushed via the free bearing 10 to move to a position where evacuation is possible, then the pressure 19 of the fluid is introduced from the pressurization port 12 into the cylinder chamber 17 and a pressurizing force 20 is thereby produced to cancel out the negative pressure 22 generated in the chamber 16 when evacuation 21 is performed. FIG. 9 is a flowchart illustrating control contents of step A. FIG. 9 illustrates steps of the movement of the pressurizing section 1 to the position where evacuation is possible and subsequent steps of the evacuation 21. That is, the pressurizing section 1 is driven by the drive section 11 to move in the direction of the pressurized section 2, the plunger 7 is pushed down (step 1, abbreviated as "S1" and the same will apply hereinafter), and the chamber 16 in which the press stages 50a, 50b are surrounded by the cylinder, plunger 7 and ring 8 is formed between the pressurizing section 1 and pressurized section 2. When the plunger 7 reaches the position where evacuation is possible (S2), the movement of the plunger 7 caused by the operation of the actuator on the cylinder is stopped and the operation of the vacuum pump 53 is turned ON, and evacuation starts (S3). In step 7, if the load is 0 and the degree of vacuum is equal to or less than a set value, step A is completed and the process moves to next step B or returns to step 4 otherwise where the pressure is decreased (S5) or increased (S6) depending on whether the load is positive or negative.

Figure 10:
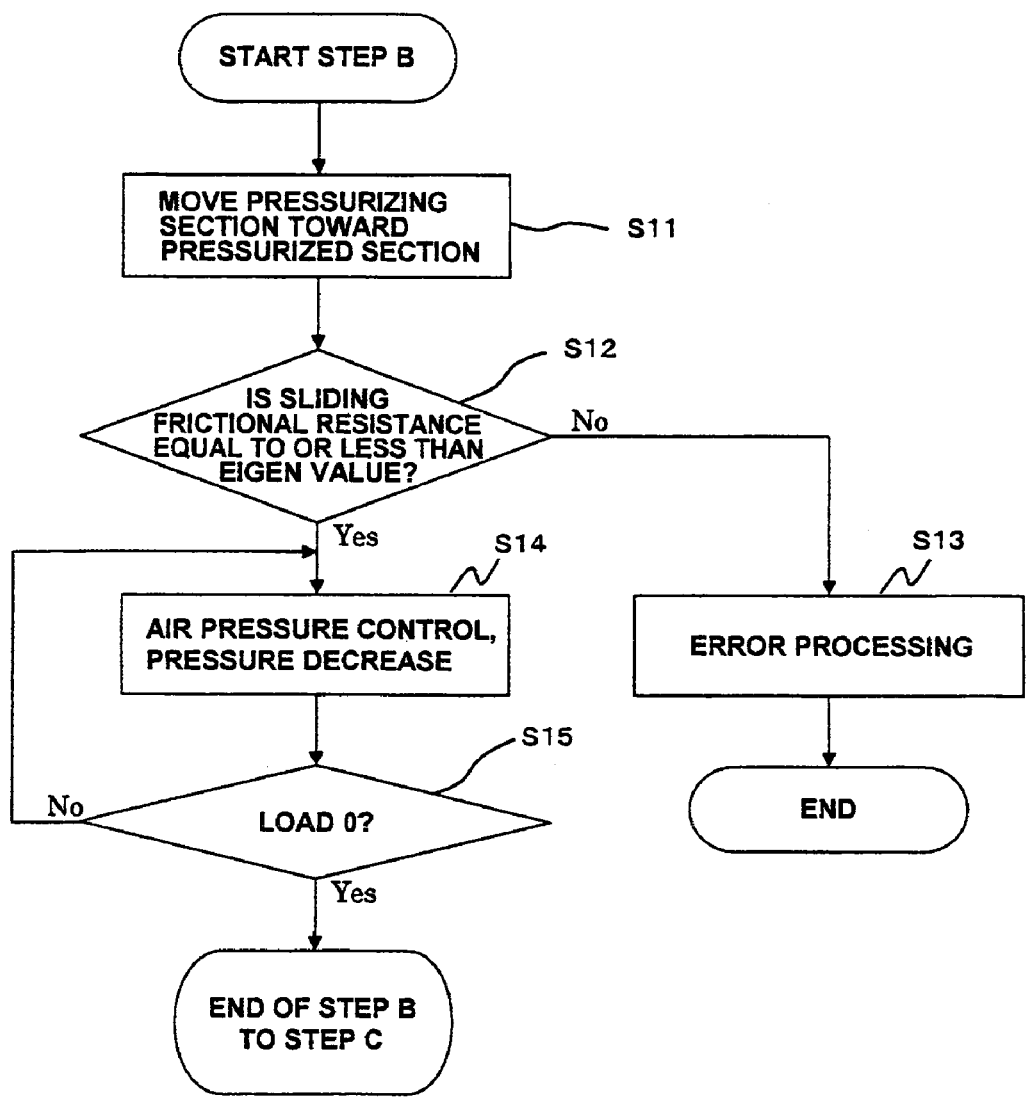
FIG. 10 is a flowchart in step B.

In next step B, as shown in the middle figure in FIG. 7, the pressurizing force 20 is adjusted to cancel out sliding resistance 23 of the plunger 7 generated when the pressurizing section 1 moves to the transfer position of a transfer target 18 after the evacuation is completed. FIG. 10 is a flowchart illustrating control contents in step B. FIG. 10 illustrates steps of adjusting the pressurizing force 20 to cancel out the sliding resistance 23 of the plunger 7. That is, the pressurizing section 1 moves in the direction toward the pressurized section 2 (S11), it is judged whether or not the sliding frictional resistance is equal to or less than an eigen value (S12), the pressure is decreased through air pressure control when the judgment result is "Yes," (S14), it is judged whether or not the load is 0 (S15) and step B is completed when the judgment result is "Yes" and the process moves to next step C or returns to step 14 otherwise where the air pressure control is repeated. When the judgment result in S12 is "No," error processing is performed (S13). In this case, since the frictional force is the one when the plunger 7 moves, the frictional force has an eigen value determined by the moving speed, area of contact and frictional coefficient, and error processing (S13) is introduced to respond to a case where an external force exceeding such a numerical value is produced. Since this step is performed before the transfer target 18 comes into contact with the surface of the press plate 5, this step is performed in an extremely short time. Furthermore, as described above, since the sliding resistance 23 is an eigen value, it is also possible to omit step B and move the process from step A to step C by removing the value from the load+detected value in step 22 in step C.

Figure 11:
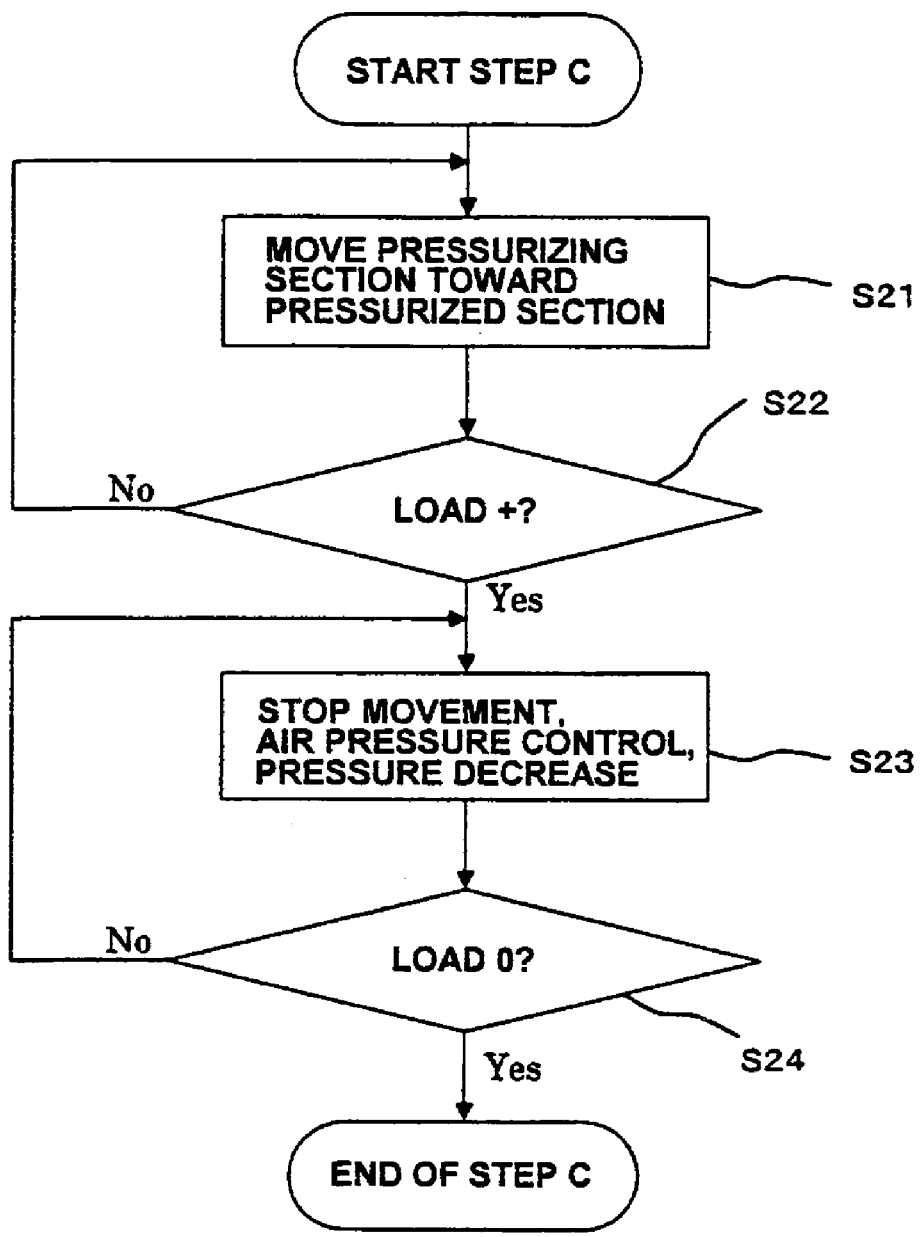
FIG. 11 is a flowchart in step C.

Finally, in step C, as shown in the bottom figure in FIG. 7, when the transfer target 18 comes into contact with the surface of the press stage 50a, 50b, the area subjected to evacuation changes (reduction of the area), and therefore a pressure variation occurs (the attractive force decreases). Control is performed to adjust the pressurizing force 20 to cancel out the variation in the negative pressure 22. FIG. 11 is a flowchart illustrating control contents of step C. FIG. 11 illustrates steps of adjusting the pressurizing force 20 to cancel out the variation in the attractive force caused by a variation in the area of evacuation. That is, the pressurizing section 1 moves in the direction toward the pressurized section 2 (S21) and when the transfer target 18 comes into contact with the surface of the press stage 50a, 50b as described above, the negative pressure 22 decreases, but the pressurizing force 20 retains the force as is, and therefore the force balance is lost and the detected pressure (load) drastically increases (S22). When the force is detected, the pressurizing section 1 stops the movement, the pressurizing force 20 is decreased (S23) and control is performed so that the pressurizing force 20 is balanced with the negative pressure 22 and the load is reduced to 0 (S24) and step C is completed when the load is reduced to 0.

Here, the calculated pressure value is as follows.

Pressurizing force 20=area of plunger 7 (or inner diameter of cylinder provided separately)×fluid pressure 19.

Negative pressure 22 in step $A$=inner area of cylinder×difference from outside air (approximately 0.1 MPa)

Negative pressure 22 in step $B$=negative pressure 22a−sliding resistance 23 of plunger 7

Negative pressure 22 in step $C$=(inner area of cylinder−area of contact of transfer target 18)×difference from outside air pressure (approximately 0.1 MPa)

This precision press device can use air, gas, oil, water or other fluid as the fluid for pressurizing the cylinder 17.

This precision press device can use an O-ring or resin (urethane, silicon, polyimide, fluorine, polyethylene or the like) which serves as an alternative thereto, as the elastic body 9 that forms a sealing section.

Figure 5:
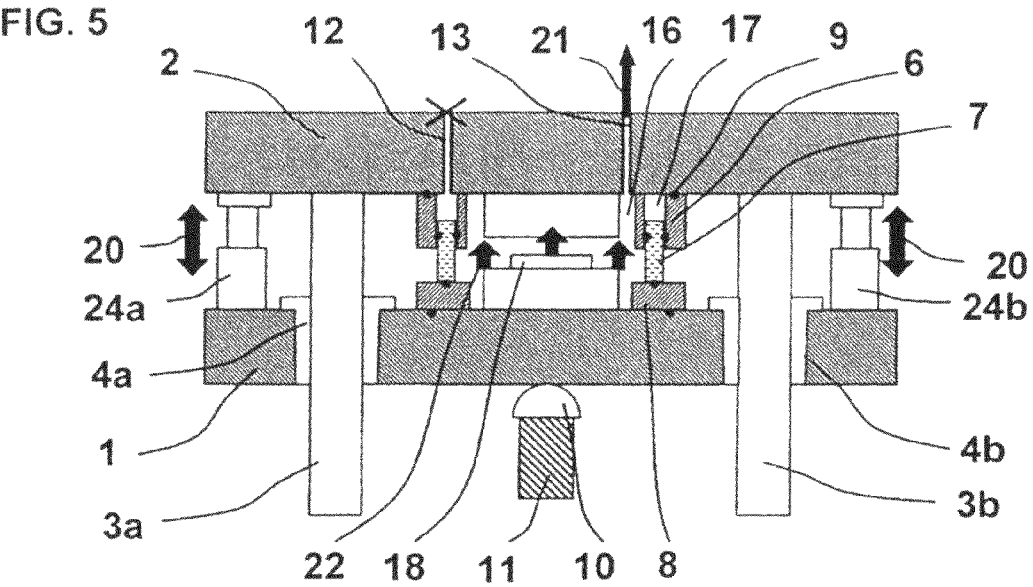
FIG. 5 is a schematic diagram of the device when cylinders 24 are installed separately.
Figure 6:
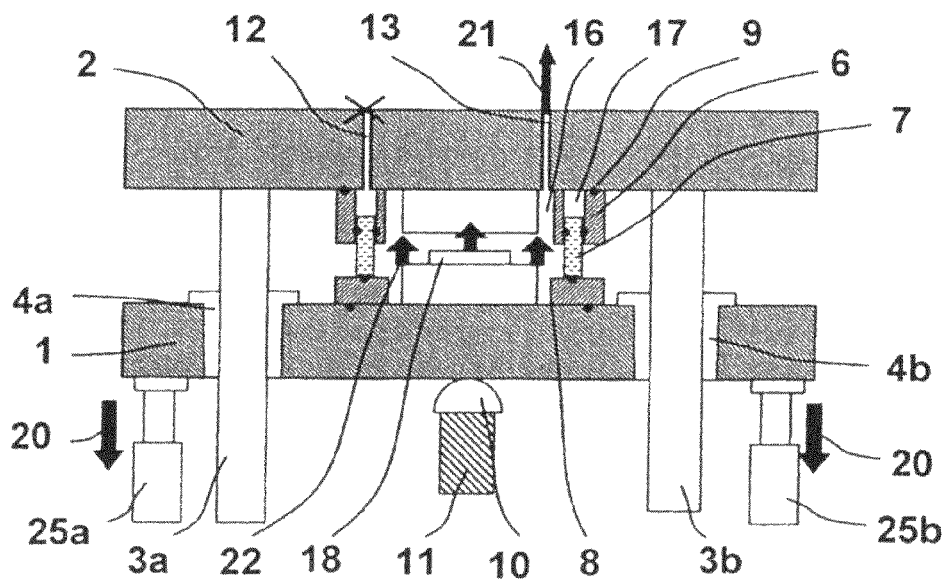
FIG. 6 is a schematic diagram of the device when cylinders 25 are installed separately.

In this precision press device, instead of canceling the negative pressure 22 by the cylinder mechanism added to the chamber 16 (introduction of pressure into the cylinder chamber 17) at the time of evacuation, cylinders 24a and 24b may be set up separately between the pressurized section 2 and the pressurizing section 1 as shown in FIG. 5 to thereby repel the negative pressure 22 in the chamber 16 through the pressurizing force 20 of the cylinders 24a and 24b. Alternatively, as shown in FIG. 6, cylinders 25a and 25b may be set up on the back of the pressurizing section 1 so as to cancel the negative pressure 22 by the attractive force 20.

The precision press device allows the cylinder-like tubular wall of the chamber 16 to have a shape capable of being provided with a cylinder mechanism having a rectangular, polygonal or ellipsoidal cross section or the like in addition to the tubular shape.

In this precision press device, the device may have the pressurizing section 1 and pressurized section 2 placed upside down.

Figure 3:
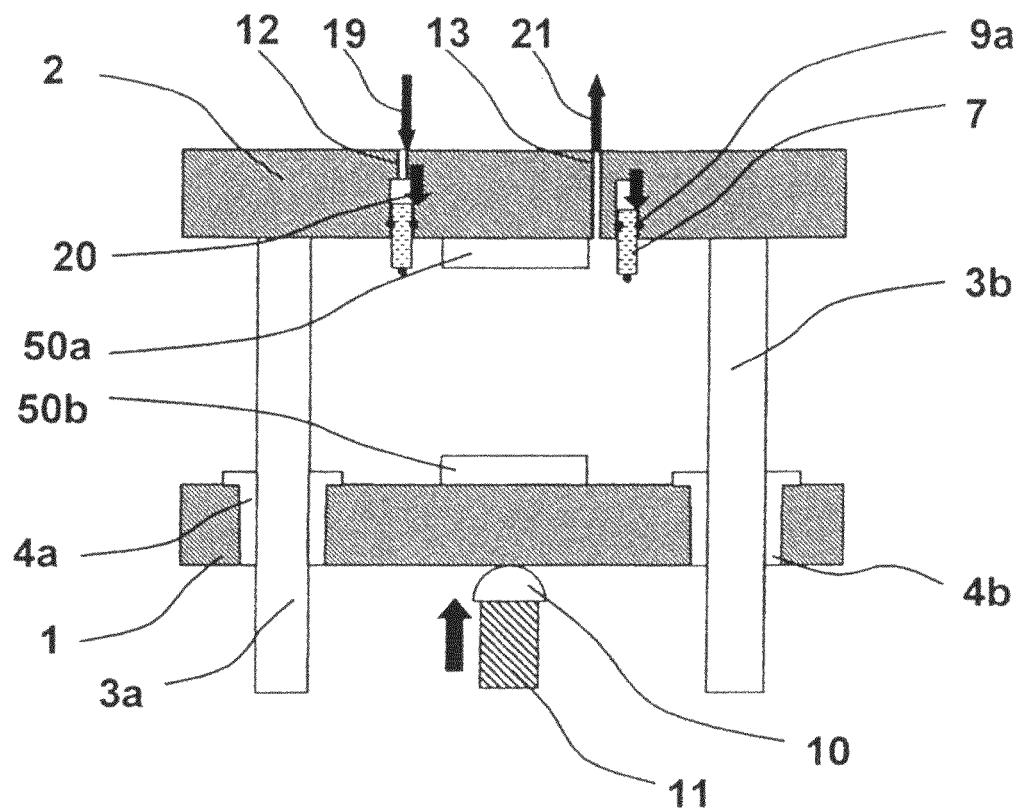
FIG. 3 is a cross-sectional schematic diagram of the precision press vacuum holding mechanism when a shape is changed.
Figure 4:
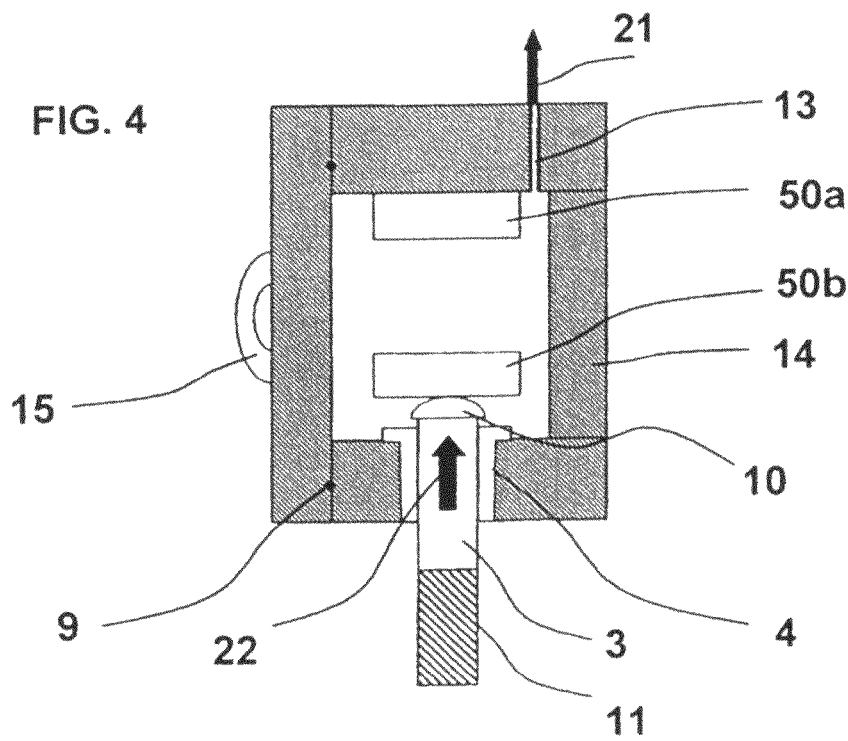
FIG. 4 is a schematic diagram of the device when a conventional vacuum box is used.

In this precision press device, as shown in FIG. 3, the cylinder mechanism may be constructed by working a ring-shaped groove in the opposing surface of the pressurized section 2 or pressurizing section 1 to form a ring-shaped cylinder chamber and embedding the tubular plunger 7 in the ring-shaped cylinder chamber.

In this precision press device, as shown in FIG. 3, at least one of the pressurizing section 1 and the pressurized section 2 has a tubular shape, but a press can also be performed by removing the chamber 16 and ring 8 from the other section (the pressurizing section 1 side in this example) leaving the opposing surface itself.

Figure 2:
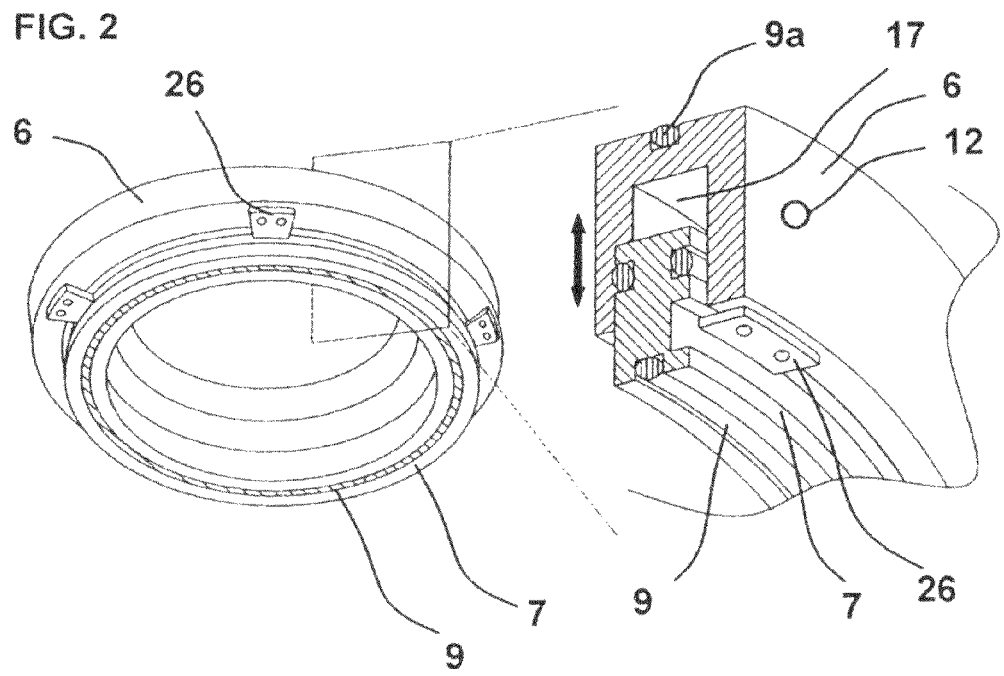
FIG. 2 is a bird's eye view and cross-sectional view of a chamber of the precision press device shown in FIG. 1.

In this precision press device, as shown in FIG. 2, at least one end plate 26 may be provided on the cylinder side of the chamber 16 as a stopper that can engage with the plunger 7 so that the plunger 7 does not come off the chamber 16. In this case, a groove may be formed in the plunger 7 as a region that does not interfere with the end plate 26 to allow the thickness of the substrate or the like. Furthermore, the pressurization port 12 communicating with the cylinder chamber 17 may be formed by perforating the outside of the cylinder. Furthermore, to prevent leakage of vacuum, grooves for accommodating O-rings 9 and 9a are formed in the distal end face of the tubular plunger 7 and the top end face of the cylinder. Furthermore, to prevent leakage of the fluid in the cylinder chamber 17, O-rings for sealing any gap in the cylinder chamber 17 are accommodated in the circumferential grooves formed in the respective cylindrical surfaces inside and outside the tubular plunger 7.

Figure 12:
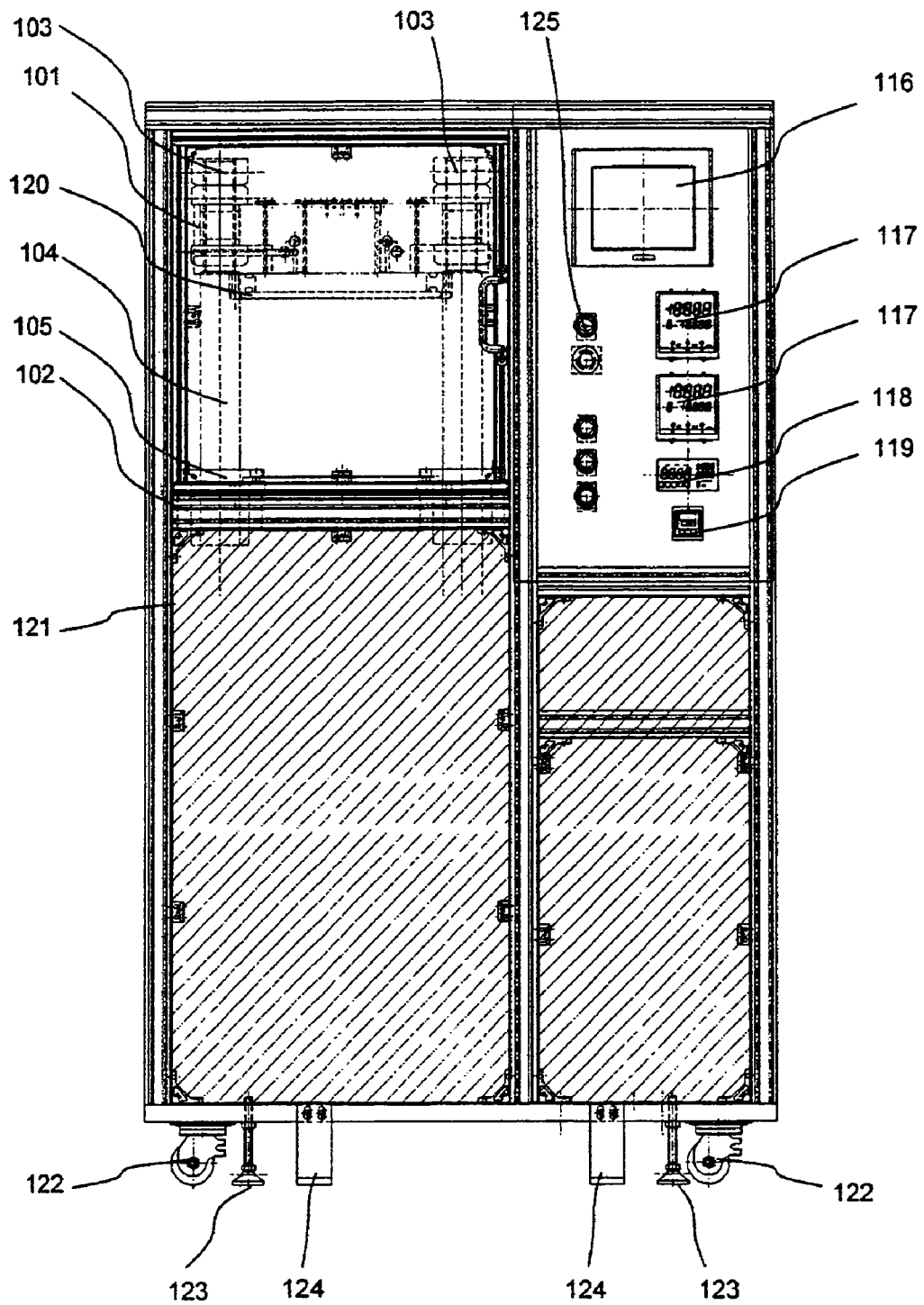
FIG. 12 is a schematic diagram of the body of the nano printing device according to the present invention.

FIG. 12 shows a front view of a nano printing device to which the precision press device of the present invention is applied.

In FIG. 12, reference numeral 101 denotes a pressurized section fixed to a guide post 104, 102 denotes a pressurizing section slidably guided to the guide post 104 via a retainer, 103 denotes an adjustment nut, which is fixed to the guide post 104 such that the height is made adjustable. Reference numeral 105 denotes a retainer and 116 denotes an operation panel, which increases/decreases the pressures of the pressurizing section and the pressurized section in the chamber, increases/decreases the temperature, performs vacuum control of the chamber, and further provides a menu or recipe to set automatic control of the pressure and temperature or the like. Reference numeral 117 denotes a heater temperature controller of the pressurized section and pressurizing section, 118 denotes a pressure display unit that displays the pressure of the pressurizing section and 119 denotes a display unit that displays the degree of vacuum in the chamber. Reference numeral 120 denotes a vacuum chamber, which is a chamber whose interior is evacuated to perform a transfer from a matrix to a substrate. Reference numeral 121 denotes a frame or cover to prevent dust or the like from entering the device. Reference numerals 122 denote casters which are used to move the entire device. Reference numeral 123 denotes an adjuster to adjust the height to achieve the levelness when the present device is installed.

Reference numeral 124 denotes an anchor seat to fix the device to a base when the levelness is achieved through the height adjustment by the adjuster. Reference numeral 125 denotes an operation button which has a power ON/OFF function.

Figure 13:
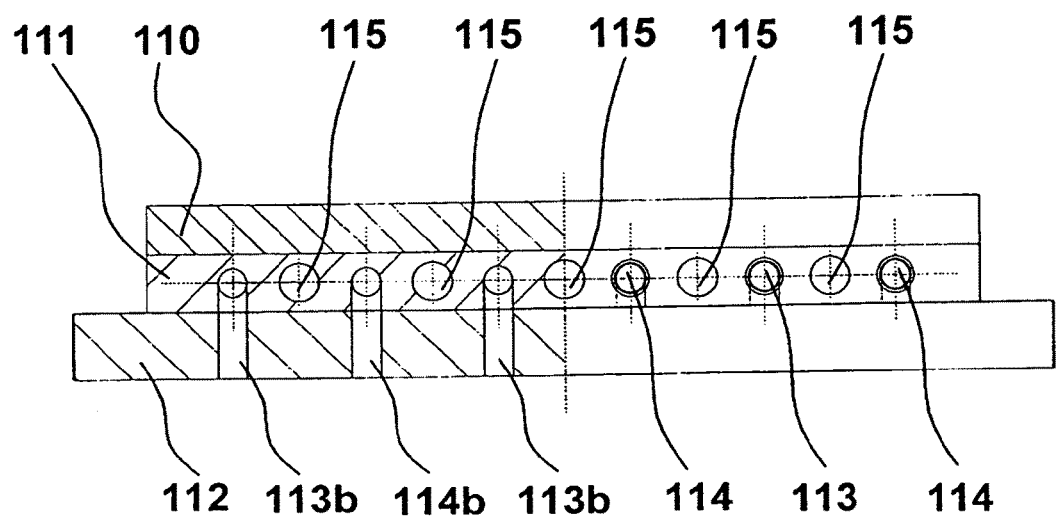
FIG. 13 is a schematic diagram of the press stage of the precision press device according to the present invention.
Figure 14:
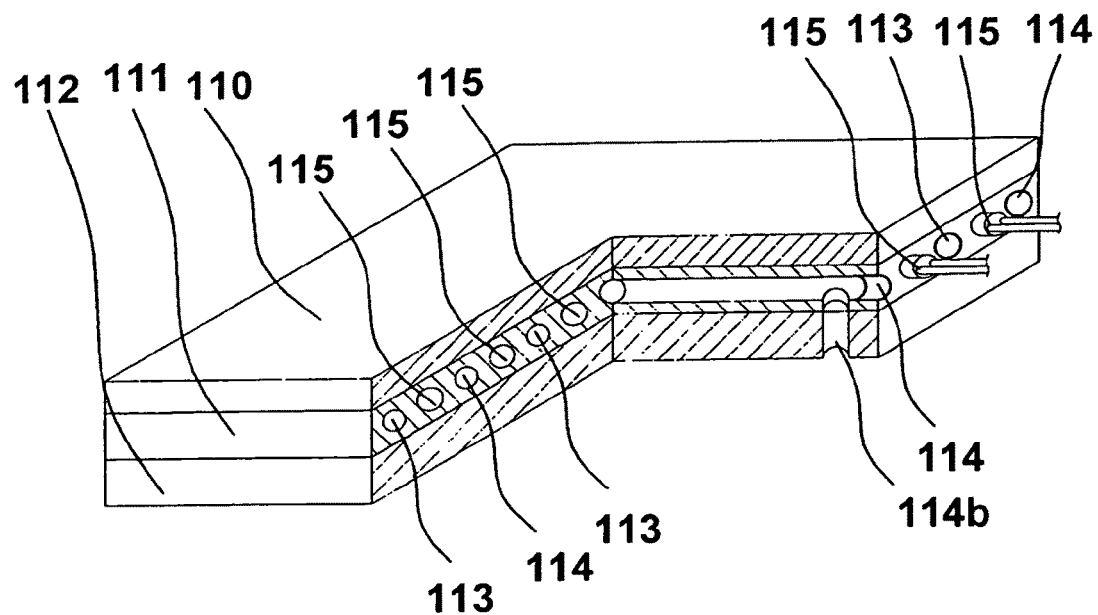
FIG. 14 is a bird's eye view of the press stage of the precision press device according to the present invention.

FIG. 13 and FIG. 14 illustrate a structure of the press stage of the device of the present invention; FIG. 13 illustrating a cross-sectional view of the press stage and FIG. 14 illustrating a perspective view.

In FIG. 13, reference numeral 110 denotes a top plate, 111 denotes a cooling/heating plate, and heaters 115 and cooling passages are set up in the cooling/heating plate 111. Reference numeral 112 denotes a heat insulator connected to the cooling/heating plate 111, which prevents heat generated by the heaters 115 from radiating. Furthermore, a cooling hole is provided in this heat insulator 112 so that a coolant returns again via the cooling/heating plate 111 through another hole formed in the heat insulator 112. In FIG. 13, reference numeral 113 denotes a coolant inlet and 114 denotes a coolant outlet. As the coolant, air, gas, water, oil or the like may be used.

The heaters 115 are substantially uniformly spaced in the cooling/heating plate 111 and cooling passages (pipes) are also substantially uniformly spaced between the heaters. Uniformly spacing the heaters and cooling passages in this way provides an effect of uniformalizing a heat distribution on the top plate, that is, an effect of eliminating temperature variations. Furthermore, as shown in FIG. 14, linear heaters are used as the heaters 115 and control temperature rises/falls by being connected to the power line from one side and turning ON/OFF the power.

Furthermore, the top plate 110 and cooling/heating plate 111 are conventionally made of a stainless material, but adopting a Cu alloy provides a high coefficient of thermal conductivity, allowing control over temperature rise/fall of the press stage to be performed in a short time, providing effects of reducing the transfer time and improving efficiency.

Figure 15:
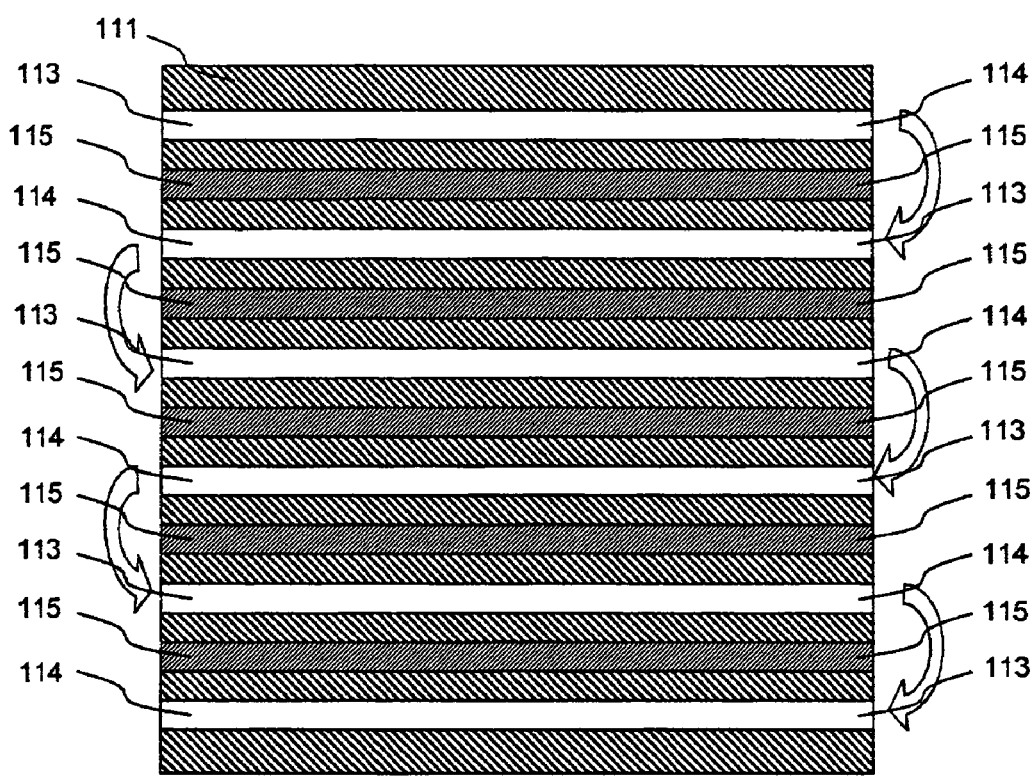
FIG. 15 is a plan view of the press stage according to the present invention.

FIG. 15 shows a plan view of the cooling/heating plate 111 of the press stage of the device according to the present invention. In FIG. 15, reference numeral 115 denotes a heater, 113 and 114 which are blank parts denote cooling passages; 113 denoting a coolant inlet and 114 denoting a coolant outlet. A coolant is injected from the coolant inlet at the top left, the coolant coming out of the coolant outlet at the top right is injected from the right side of the cooling passage on the second row, the coolant coming out of the left side of the cooling passage on the second row is injected into the cooling passage on the third row. This configuration is a configuration whereby the coolant is sent sequentially in order of cooling passages. Such a configuration provides an effect of cooling the temperature of the top plate uniformly and in a short time.

Figure 16:
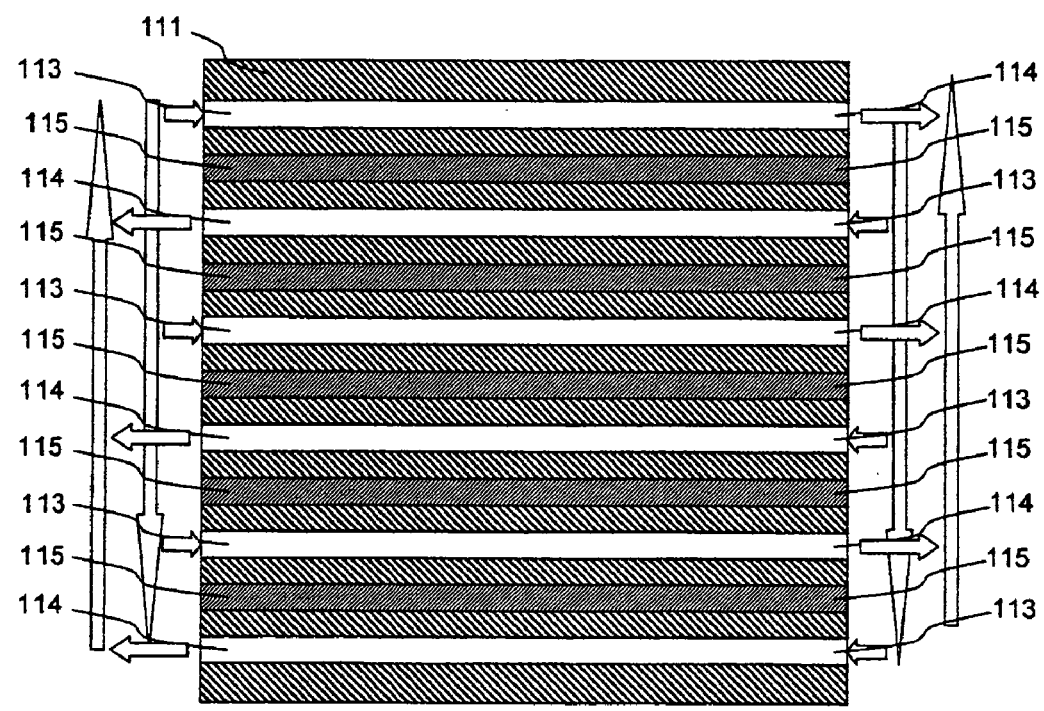
FIG. 16 is a plan view of another press stage according to the present invention.

Furthermore, FIG. 16 is another embodiment with a different coolant flow. The configuration in FIG. 16 is a configuration whereby a coolant is made to flow into the cooling passage on the first row (blank section in the figure) from the left side, cooling passage (blank section in the figure) on the third row and cooling passage (blank section in the figure) on the fifth row, and the coolant is made to flow into the cooling passage (blank section in the figure) on the second row from the right side, cooling passage (blank section in the figure) on the fourth row and the cooling passage (blank section in the figure) on the sixth row. Making the coolant flow from the left or right in this way makes it possible to enhance the cooling effect of the press stage. Furthermore, this also provides an effect of reducing temperature variations of the top plate.

The device of the present invention has been researched and developed as a thermal nano imprinting or optical nano imprinting technique, which is a technique of molding a nano scale (nano meter is one-billionth of meter) uneven pattern. The thermal nano imprinting device involved in the development this time has achieved downsizing and low cost among nano imprinting devices of comparable levels by improving the heating/cooling mechanism, suppressing temperature variations within the plane of the transfer stage, drastically reducing a 120° temperature rise/fall time to four minutes and by reviewing the device structure and parts. The use of the present device allows a nano scale structure to be molded within ten minutes for a work size of up to φ150 mm. The specification of the nano imprinting device this time is as follows.

TABLE 1

| Specification of thermal nano imprinting device | |
|---|---|
| Item | Specification |
| Body size | 970 mm (w) × 1600 mm (H) × 600 mm (D) |
| Work shape | Φ150 mm |

TABLE 1-continued

Specification of thermal nano imprinting device

| Item | Specification |
| --- | --- |
| Degree of vacuum | 1.33 kPa (10 Torr) or less |
| Press thrust | Max 98 kN (10t) |
| Heating temperature | Max 300° C. |
| Heating speed | 2.5 minutes (60→180° C.) |
| Cooling speed | 1.5 minutes (180→60° C.) |

The nano imprinting technique that is getting attention as a next-generation micro processing technique is under study and development in various ways aimed at commercialization centered on Japan, the United States and Europe. The "nano imprinting" is a processing technique of pushing a mold in which a nano scale uneven pattern is molded (also referred to as "metal die," "stamper" or "template") against a transfer target material such as polymer and molding an uneven pattern. The development of semiconductor, optical device, next-generation storage device or bio-device is underway using the present technique and how to improve productivity is one of challenges in its commercialization. The thermal nano imprinting in particular is a technique of pressing the mold in the transfer target material softened by heating to a glass transition temperature or higher, and therefore the temperature rise/fall time is becoming the bottleneck in the realization of high throughput.

Against such a background, a new thermal nano imprinting device has been developed aiming at achieving a high throughput. With a drastic review of the heater structure and material based on a thermal analysis, temperature variations at the time of heating have been suppressed and the heating time has been shortened. Furthermore, the cooling time has been drastically shortened by making full use of the cooling control technique developed with metal dies for injection molding optical disks. Moreover, by redesigning the vacuum chamber structure of a conventional machine, it is now made possible to reduce the chamber volume, downsize the device and drastically shorten the deaeration time.

Furthermore, by making full use of the precision processing technique for plastic molded metal dies owned by the present applicant, the transfer stage surface has become a high precision stage with a flatness of several μm and a profile irregularity of several nm. Furthermore, adopting a greater work extracting section than that of a conventional machine in consideration of mold setting work and replacement of transfer stages or the like has improved maintainability.

A feature of the device of the present invention is that the device has improved the heating/cooling mechanism and realized an industry leading temperature rise/fall time of 4 minutes (60°→180°→60°). Moreover, the present invention reviews the device structure and parts and has achieved a small-sized and low-cost device among devices of comparable levels (φ6 inches). As for the transfer size (width, length, sheet thickness), the present device is applicable to max φ6 inches. The sheet thickness is withdrawn from consideration. Furthermore, double-sided transfer is possible. The transfer material is PS (polystyrene), PC (polycarbonate), PMMA (polymethylmethacrylate) or the like which is transferrable to thermoplastic resin or thermosetting resin.

The maximum heating temperature is 300° C. As the cooling method, two methods of water cooling (rapid cooling) and N2 (nitrogen) gas cooling (slow cooling) are adopted to perform high accuracy temperature adjustment. Suppose the degree of vacuum is 1.33 kPa (10 Torr) or less. The maximum load of the present device is 98 kN (10 t). Though the transfer speed depends on the pattern shape to be transferred, a transfer within 10 minutes or less is possible in the basic process. Further shortening is possible through optimization of process conditions or the like.

As for the pressurization method, a two-stage pressure control method is adopted for a transfer of a micro nano structure with high accuracy. The "two-stage pressurization" is a pressurization method whereby first pressurization is performed through torque control of the servo motor accompanying an ascent of the stage and followed by the present pressurization.

As for a transfer to a large area, the present device is applicable to maximum φ6 inches, but the device development by the present applicant has a proven result of a transfer to maximum φ12 inches. A high aspect ratio transfer is normally a transfer with an aspect ratio of 2 or less. As for the minimum transfer size, the present applicant has a proven result that a dot pattern of φ70 nm and H 110 nm was transferred. As for a transfer of a through hole, working of a through hole using a nano imprinting technique is generally considered impossible. Since the transfer accuracy may deteriorate due to the influences of temperature distribution of the transfer target material, trapping of bubbles in the mold-shaped concave pattern or the like, the vacuum atmosphere is adopted in the present device. Furthermore, provision of an automatic peeling mechanism as an option makes automatic peeling possible.

As for the transfer target material, thermoplastic material and thermosetting resin can be supported, and crystalline resin can also be used though crystalline resin is hard to be transferred. As for a transfer to resin applied to the substrate, thermoplastic resin or thermosetting resin may be applied and transferred to a Si (silicon) substrate or glass substrate. As the mold material, Si (silicon), Ni (nickel), quartz or the like can be used. The mold can be manufactured using photolithography which is a semiconductor manufacturing technique or electron beam direct drawing method.

Next, the precision press device for parallelism alignment with high accuracy will be explained.

Figure 17:
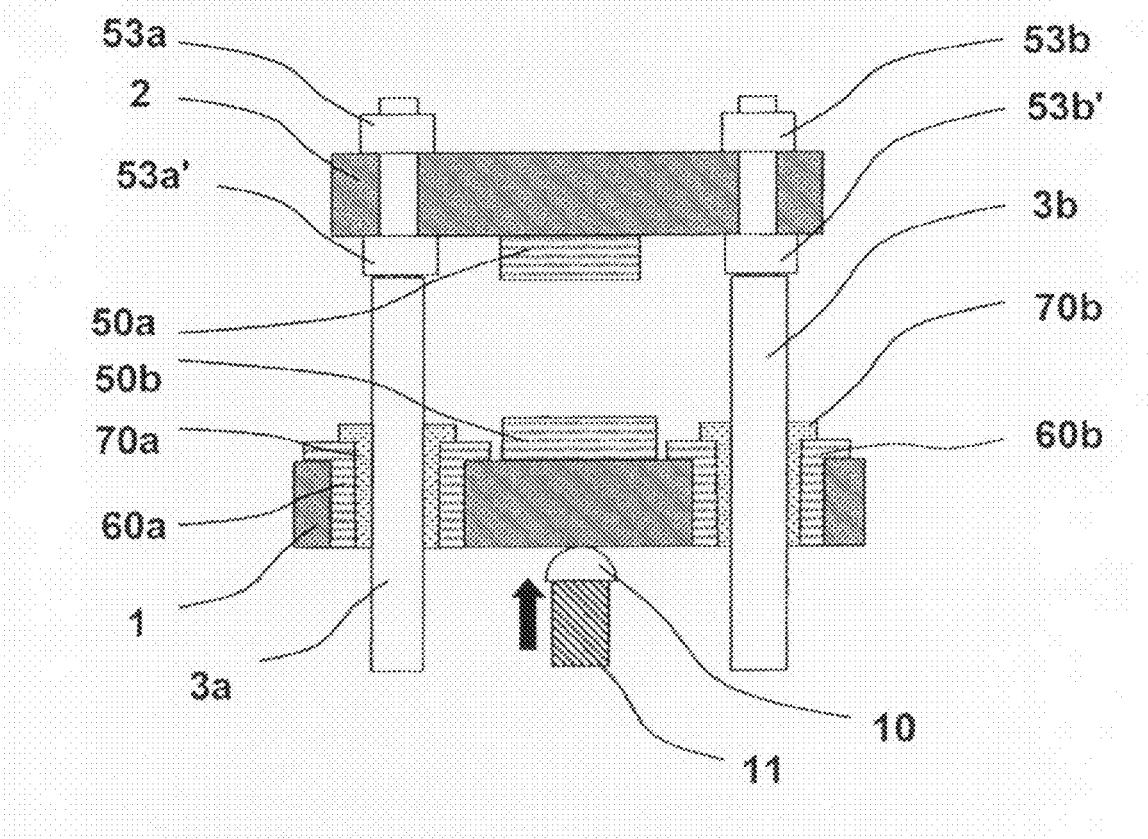
FIG. 17 is a cross-sectional schematic diagram illustrating an embodiment of the precision press device according to the present invention.
Figure 18:
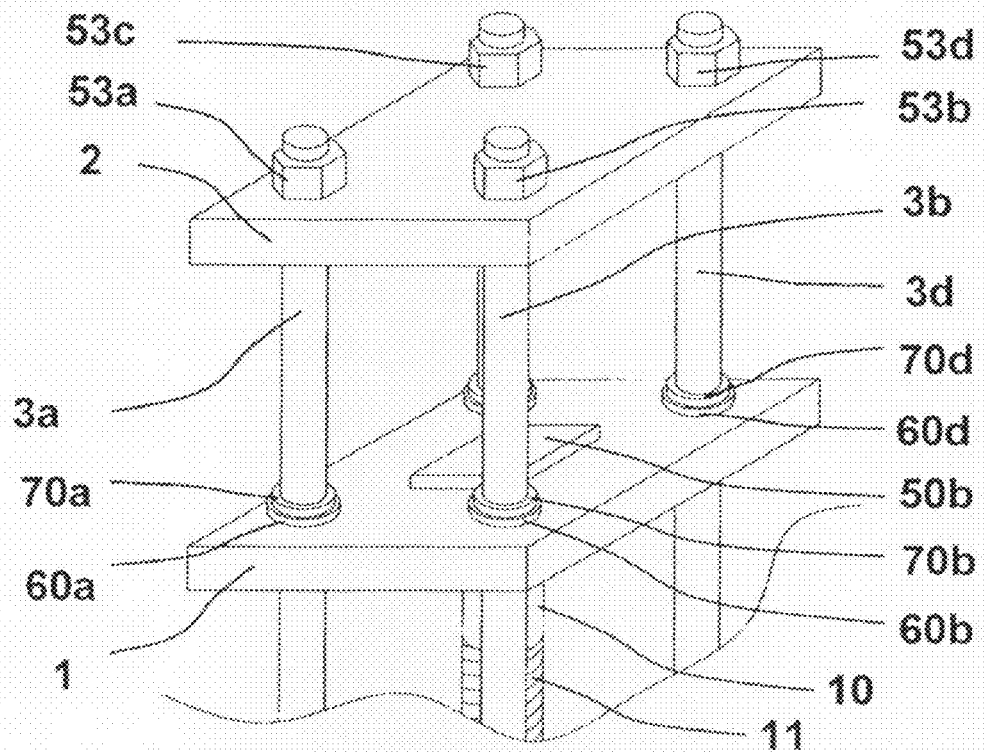
FIG. 18 is a schematic perspective view of the precision press device shown in FIG. 1.

An embodiment of the precision press device according to the present invention will be explained with reference to FIG. 17 and FIG. 18. The embodiment of the present precision press device is applied as a micro structure transfer device (nano imprinting device) that performs press molding of an ultra-micro pattern. The precision press device shown in FIG. 17 is basically provided with a pressurized section 2 fixed at one end of a plurality of (3, preferably 4 as illustrated) guide posts 3a, 3b, 3c and 3d arranged in parallel (hereinafter reference numeral 3 will be used as a generic name and the same will apply to other components), a pressurizing section 1 disposed opposed to the pressurized section 2 and disposed in a manner movable closer to or away from the pressurized section 2 while sliding on the guide posts 3 and a drive section 11 that drives the pressurizing section 1 toward the pressurized section 2 via a free bearing 10.

The pressurized section 2 is fixed to the guide posts 3 by means of adjustment nuts 53. Fine pitch threads or other threads can be used for the adjustment nuts 53. The adjustment nuts 53 allow the mounting height of the pressurized section 2 with respect to the guide posts 3 to be adjusted at 1/100 mm levels during assembly and allow the flatness of the pressurized section 2 to be adjusted at nano levels even after assembly. Using three or more guide posts 3 or preferably four guide posts 3 as illustrated allows the pressurized section 2 to be uniformly guided. The number of guide posts can be only two if the parallelism between the two sections can be secured.

The pressurizing section 1 is disposed slidably with respect to the guide posts 3 via retainers 70 and elastic bodies 60. Slide holes through which the respective guide posts 3 are inserted are formed in the pressurizing section 1 and the elastic bodies 60 are fixed by being fitted into the slide holes. As the retainer 70, for example, a direct-acting guide bearing can be used and provided with a high alignment property until the molded die comes into contact with the transfer target. The elastic body 60 has a tubular shape made of, for example, urethane resin, and is provided with a flange section at one end and positioned in contact with the top surface of the pressurizing section 1. The elastic body 60 is provided with the retainer 70 by being fitted into the cylindrical interior. The retainer 70 is also formed into a tubular shape with a flange section provided at one end and the flange section is positioned in contact with the flange section of the elastic body 60. Since the guide post 3 is inserted in the cylindrical interior of the retainer 70, the retainer 70 can slide on the guide post 3, and as a result, the pressurizing section 1 can slide on the guide post 3 via the retainer 70 and elastic body 60.

The opposing surfaces of the pressurized section 2 and the pressurizing section 1 are provided with press stages 50$a$ and 50$b$ respectively. A matrix, on the surface of which a fine pattern is formed is arranged on one of the press stages 50$a$ and 50$b$ and a substrate is arranged on the other, and the fine pattern is transferred to the substrate by the substrate being pushed against the matrix during a press.

The elastic body 60 is set up in the guide post 3 to adjust the flatness at the time of a press at nano levels. The elastic body 60 absorbs the entire variation of the pressurizing section 1 and thereby keeps the press stage 50$b$ or the entire pressurizing section 1 level, and absorbs any inclination and deflection of the pressurizing section 1 so as to align with the pressurized section 2.

As for the operation of the present precision press device, the pressurizing section 1 is guided by the guide posts 3 via the retainers 70 and elastic bodies 60, and the elastic body 60 is not distorted during rocking until pressurization starts, and therefore high accuracy alignment is provided. The drive section 11 that drives the pressurizing section 1 presses the pressurizing section 1 via the free bearing 10. The distal end of the free bearing 10 is spherical, and the pressurized section 2 and the pressurizing section 1 align with each other during a press operation, that is, even when the press stages 50$a$ and 50$b$, which will be described later, align with each other due to elastic deformation of the elastic body 60, the load can be applied to the pressurizing section 1 at a single point. As the elastic body 60 elastically deforms at the time of pressurization, the relative inclination and deflection between the pressurized section 2 and the pressurizing section 1 are absorbed. Therefore, the alignment between the pressurized section 2 and the pressurizing section 1 is maintained, a uniform load is applied to the press stage 50$a$, 50$b$ and press molding can be performed accurately with a high degree of flatness.

The pressurizing section 1 and the drive section 11 are not fixed via a bolt but attached so as to be rockable to a certain extent by means of a stripper bolt, damper, spring or the like, and placed on the free bearing 10. The free bearing 10 is used as a medium whereby the drive section 11 and the pressurizing section 1 contact each other, but a free joint provided with a spherical bearing which combines a sphere and a spherical surface can also be used.

The precision press device can use a servo motor, air cylinder, hydraulic cylinder or the like as the drive source of the drive section 11.

Figure 19:
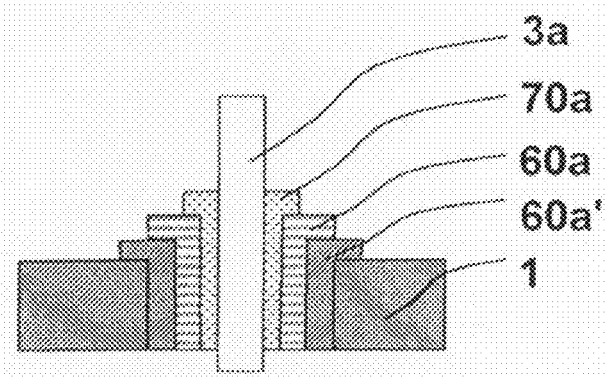
FIG. 19 is a partial view illustrating a setup of an elastic body different from the setup of the elastic body of the precision press device shown in FIG. 1.

In the present precision press device, one type of elastic body or a plurality of types of elastic bodies of different moduli of elasticity can be used simultaneously as the elastic body 60. FIG. 19 is a cross-sectional view illustrating main parts of the precision press device simultaneously using two types of elastic bodies 60$a$ and 60$a'$ having different moduli of elasticity as the elastic body 60. In this example, the elastic bodies 60$a$ and 60$a'$ are configured as inner and outer nested double cylindrical bodies. The use of such a plurality of elastic bodies makes it possible to respond to variations of necessary pressures depending on the type of material of press molding and also follow the inclination of the molding die. Furthermore, resin other than urethane (silicon, polyimide, fluorine, polyethylene or the like), spring or damper can be used for the elastic body 60.

A case has been explained where the elastic body 60 of the present precision press device is a flanged cylindrical body with a flange formed at one end, but the shape is not limited to this and it is also possible to adopt a cylinder having cylindrical, circular or rectangular shape or a shape of an elastic body whereby alignment between the pressurized section 2 and the pressurizing section 1 can be obtained.

It is assumed with the present precision press device that when the drive section 11 pushes the pressurizing section 1, the free bearing 10 contacts the pressurizing section 1 at a single point, but it is also possible to adopt a configuration with a plurality of points uniformly arranged. Even when a plurality of points are arranged, the respective points are arranged uniformly, and therefore the load is applied uniformly to the pressurizing section 1 and press stage 50$b$.

FIG. 20 is a longitudinal cross-sectional view illustrating another embodiment of the precision press device. In the embodiment shown in FIG. 20 compared to the embodiment shown in FIG. 17, elastic bodies 60A and 60B for following the inclination of the molding die of the press stages 50$a$ and 50$b$ with respect to the guide posts 3 are provided in the pressurized section 2 instead of being provided in the pressurizing section 1. The elastic bodies 60A and 60B are configured as flange type cylindrical bodies and fixed to the pressurized section 2 by being sandwiched between adjustment nuts 53$a$ and 53$a'$. In this embodiment, the relative inclination and deflection between the pressurized section 2 and the pressurizing section 1 are absorbed by the elastic bodies 60A and 60B provided only on the pressurized section 2 side. The pressurizing section 1 is made slidable on the guide posts 3 via the retainers 70. The rest of the configuration is similar to that of the embodiment shown in FIG. 17 and FIG. 18, and therefore overlapping explanations will be omitted.

FIG. 21 is a longitudinal cross-sectional view illustrating a further embodiment of the precision press device according to the present invention. In the embodiment shown in FIG. 21 compared to the embodiment shown in FIG. 17, elastic bodies 60 for following the inclination of the molding die of the press stages 50$a$ and 50$b$ with respect to the guide posts 3 are provided not only in the pressurizing section 1 but also in the pressurized section 2. On the pressurized section 2 side, elastic bodies 60A and 60B are configured into flange type cylindrical bodies and are fixed to the pressurized section 2 by being sandwiched between adjustment nuts 53$a$ and 53$a'$. In this embodiment, elastic bodies 60$a$ and 60$b$ are also provided on the pressurizing section 1 side. Therefore, the relative inclination and deflection between the pressurized section 2 and the pressurizing section 1 are absorbed by the elastic bodies 60A and 60B, and 60$a$ and 60$b$ provided on the pressurized section 2 and pressurizing section 1 respectively. The pressurizing section 1 is made slidable on the guide posts 3 via the retainers 70. The rest of the configuration is similar to that of the embodiment shown in FIG. 17 and FIG. 18, and therefore overlapping explanations will be omitted.

FIG. 22 is a longitudinal cross-sectional view illustrating a still further embodiment of the precision press device according to the present invention. In the embodiment shown in FIG. 22, the drive section 11 and free bearing 10 are moved from the side assumed to be the pressurizing section 1 in the example shown in FIG. 19 to the side assumed to be the pressurized section 2. Therefore, in the embodiment shown in FIG. 22, reference numeral 2 denotes the pressurizing section as a movable section and reference numeral 1 denotes the pressurized section as a fixed section. The movable section moved by the drive section 11 can be set up either in the upward direction or downward direction, and press-molding is possible in both cases.

What is claimed is:

1. A precision press device comprising:
a pressurized section;
a pressurizing section opposed to the pressurized section and disposed in a manner movable forward or backward with respect to the pressurized section;
press stages mounted on opposing surfaces of the pressurized section and the pressurizing section;
a drive section that drives the pressurizing section; and
a chamber having a tubular wall that surrounds the press stages so that the press stages are sealed between the pressurized section and the pressurizing section when the pressurized section and the pressurizing section are located close to each other,
wherein the precision press device comprises a fluid operation section that cancels out attractive forces between the pressurized section and the pressurizing section generated based on a negative pressure in the chamber,
wherein the fluid operation section comprises:
a cylinder that constitutes the tubular wall and is provided for at least one of the pressurized section and the pressurizing section;
a tubular plunger provided in a manner movable forward or backward with respect to the other of the pressurized section and the pressurizing section based on a fluid pressure in the cylinder; and
a pressure control section that controls the fluid pressure in the cylinder and generates a pressurizing force which is a force in a direction that cancels out the attractive forces between the pressurized section and the pressurizing section in the tubular plunger.

2. The precision press device according to claim 1, wherein a sealing member is provided at a distal end of the tubular plunger that contacts the other of the pressurized section and the pressurizing section to keep the chamber in a vacuum when the tubular plunger is in the advanced position.

3. The precision press device according to claim 1, wherein the cylinder is a tubular cylinder attached to the opposing surface of the one of the pressurized section and the pressurizing section, and
the tubular plunger is accommodated hermetically sealed inside the tubular cylinder and provided in a manner movable forward or backward from the distal end of the tubular cylinder toward the other of the pressurized section and the pressurizing section.

4. The precision press device according to claim 1, wherein in order to cancel out the attractive forces between the pressurized section and the pressurizing section, the fluid operation section is a fluid operation section for a pushing pressure disposed between pressurized section and the pressurizing section or a fluid operation section for a pulling pressure disposed between the pressurizing section and a fixed section.

5. The precision press device according to any one of claims 1 and 2 to 4, wherein the fluid operation section sequentially follows three steps A, B and C shown below as timings of making a pressure adjustment:
step A of moving the pressurizing section to a position where evacuation is possible and generating a pressurizing force to cancel out a negative pressure generated when evacuation is performed;
step B of adjusting the pressurizing force to cancel out sliding resistance of the fluid operation section generated when the pressurizing section moves to a position of transfer to a transfer target after the evacuation is completed; and
step C of adjusting the pressurizing force to respond to a pressure variation caused by a variation in the area to be evacuated when the transfer target contacts a surface of a press plate.

6. The precision press device according to any one of claims 1 and 3 to 5, wherein each press stage is provided with heating/cooling capability.

7. The precision press device according to claim 5, wherein the negative pressure generated by the evacuation is used as a pressurizing force.

8. The precision press device according to any one of claims 1 and 3 to 5, wherein the chamber comprises at least one pressurizing port.

9. The precision press device according to any one of claims 1 and 3 to 5, wherein the tubular wall of the chamber is formed into a tubular shape such as cylinder shape, square tubular shape or polygonal tubular shape.

* * * * *